(12) United States Patent
Kravitz et al.

(10) Patent No.: US 12,355,788 B2
(45) Date of Patent: Jul. 8, 2025

(54) SYSTEMS AND METHODS FOR BLOCKCHAIN-BASED CYBER THREAT MANAGEMENT

(71) Applicant: The Travelers Indemnity Company, Hartford, CT (US)

(72) Inventors: Ethan M. Kravitz, West Hartford, CT (US); Venkat R. Bethi, Glastonbury, CT (US); Velda M. Johnson, Maplewood, MN (US); Nirav I. Pravasi, Farmington, CT (US); Shravanthi Duvvuri, Simsbury, CT (US); William S. Immendorf, Madison, WI (US); Alec B. Perro, Dallas, TX (US); Jared Kozak, Berlin, CT (US)

(73) Assignee: The Travelers Indemnity Company, Hartford, CT (US)

( * ) Notice: Subject to any disclaimer, the term of this patent is extended or adjusted under 35 U.S.C. 154(b) by 544 days.

(21) Appl. No.: 17/864,518

(22) Filed: Jul. 14, 2022

(65) Prior Publication Data
US 2024/0022584 A1    Jan. 18, 2024

(51) Int. Cl.
*H04L 9/40*    (2022.01)
*H04L 9/00*    (2022.01)

(52) U.S. Cl.
CPC ............ *H04L 63/1425* (2013.01); *H04L 9/50* (2022.05); *H04L 63/1433* (2013.01)

(58) Field of Classification Search
None
See application file for complete search history.

(56) References Cited

U.S. PATENT DOCUMENTS

| | | | |
|---|---|---|---|
| 10,904,272 B2 | 1/2021 | Park et al. | |
| 10,904,282 B2 | 1/2021 | Kibler et al. | |
| 10,917,428 B2 | 2/2021 | Crabtree et al. | |
| 10,924,501 B2 | 2/2021 | Park et al. | |
| 12,190,387 B1 * | 1/2025 | Cardot | G06Q 40/08 |
| 2016/0110819 A1 * | 4/2016 | Abramowitz | H04L 63/1416 705/4 |
| 2016/0112445 A1 * | 4/2016 | Abramowitz | G06Q 40/08 726/23 |
| 2021/0398225 A1 * | 12/2021 | Crabtree | G06Q 30/0611 |

* cited by examiner

*Primary Examiner* — Joseph P Hirl
*Assistant Examiner* — Hassan Saadoun
(74) *Attorney, Agent, or Firm* — RowanTree Law Group, PLLC; Carson C. K. Fincham

(57) ABSTRACT

Systems, apparatus, methods, and articles of manufacture for blockchain-based cyber threat management, such as the generation and management of cyber risk insurance policies with automatic cyber threat assessment, remediation, and/or claim payment.

18 Claims, 13 Drawing Sheets

SYSTEMS AND METHODS FOR BLOCKCHAIN-BASED CYBER THREAT MANAGEMENT

COPYRIGHT NOTICE

A portion of the disclosure of this patent document contains material which is subject to copyright protection. The copyright owner has no objection to the facsimile reproduction by anyone of the patent document or the patent disclosure, as it appears in the U.S. Patent and Trademark Office patent file or records, but otherwise reserves all copyright rights whatsoever.

BACKGROUND

Due to significantly increased cyber threat occurrences in recent years, cyber risk insurance has become necessary for many businesses in various industries. Because a cyber risk insurance policy is an underwriting product that necessarily involves a plurality of parties (at least the insured, the insurance carrier, a cyber assessment entity, and often an agent or other intermediary), the cyber risk issuance process is lengthy, complicated, and requires a great deal of inter-party communications. Due to the complex nature of modern business computing systems, breach detection, breach reporting, and the claims process subsequent to a breach or other cyber threat event are often complex and time consuming.

BRIEF DESCRIPTION OF THE DRAWINGS

The figures depict embodiments for purposes of illustration only. One skilled in the art will readily recognize from the following description that alternative embodiments of the systems and methods illustrated herein may be employed without departing from the principles described herein, wherein.

DETAILED DESCRIPTION

I. Introduction

Time saved in detecting, reporting, and/or addressing cyber threat occurrences can significantly impact the overall extent and cost of the threat event. Typical cyber threat assessments are snapshots in time of current Information Technology (IT) infrastructure, settings, and practices for an organization. Such assessments may identify threat vectors, but do not detect events themselves. The cost and complexity required to conduct IT forensic investigations subsequent to a breach are often quite significant, even if no actual damage, ransom, etc., has been incurred. Cyber insurance policies typically are formulated based on the results of a cyber threat assessment in assigning risk to a particular account (e.g., an organization having a particular set of IT assets, infrastructure, and practices in place). Such policies are static and reactive, however, at best providing claim payouts after a cyber threat event/breach has occurred. In the typical case where threat event detection and reporting are delayed (sometimes for as long as hundreds of days), the amount of damage incurred and the claim damage amounts that must be paid are both significantly higher.

In accordance with embodiments herein, these and other deficiencies of existing systems are remedied by providing systems, apparatus, methods, and articles of manufacture for blockchain-based cyber threat management. In some embodiments, for example, specially-programmed chain code instructions customized for a cyber threat insurance, detection, reporting, and/or management process may be generated, stored, and/or replicated across various remotely-situated and cooperative network devices or "nodes". According to some embodiments, the chain code may include instructions that cause transmission of one or more specialized cyber insurance chain code blocks or "payloads" to a plurality of remote nodes. In some embodiments, "dark web" and/or other cyber threat information may trigger blockchain payload creation and/or may comprise the contents of one or more blockchain payloads.

II. Blockchain-Based Cyber Threat Management Systems

Figure 1:
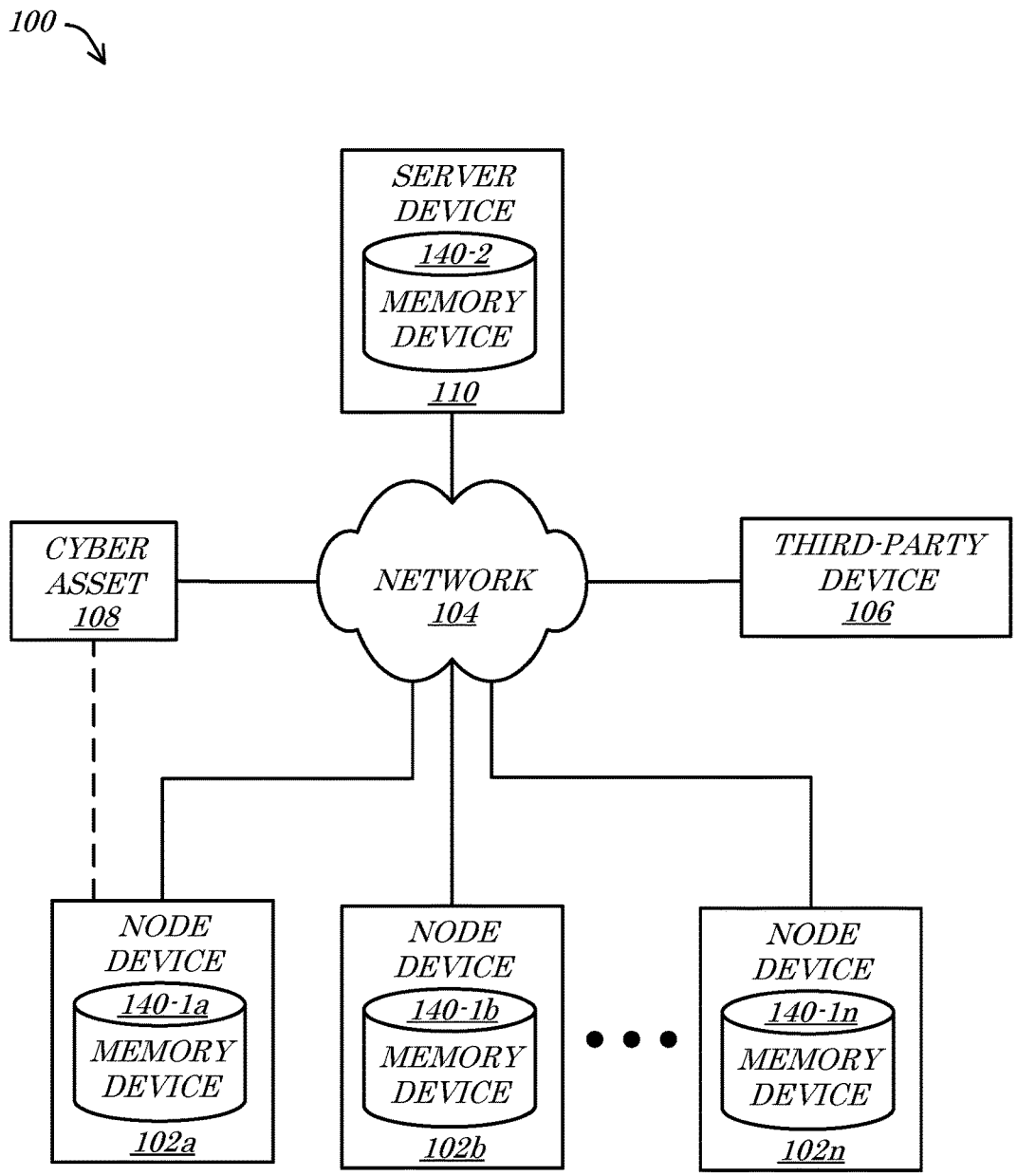
FIG. 1 is a block diagram of a system according to some embodiments.

Referring first to FIG. 1, a block diagram of a system 100 according to some embodiments is shown. In some embodiments, the system 100 may comprise a plurality of node devices 102a-n, a network 104, a third-party device 106, a cyber asset 108, and/or a server device 110. According to some embodiments, any or all of the components 102a-n, 106, 108, 110 may comprise and/or be in communication with a data storage and/or memory device 140-1a-n, 140-2. Each node device 102a-n may comprise a local memory device 140-1a-n, for example, and/or the server device 110 may comprise a network memory device 140-2. As depicted in FIG. 1, any or all of the components 102a-n, 106, 108, 110, 140-1a-n, 140-2 (or any combinations thereof) may be in communication via the network 104. In some embodiments, communications between and/or within the components 102a-n, 106, 108, 110, 140-1a-n, 140-2 of the system 100 may be utilized to provide a blockchain-based cyber threat management platform. The server device 110 may, for example, interface with one or more of the node devices 102a-n and/or the third-party device 106 to execute multiple instances of specially-programmed chain code (not depicted) stored in any or all of the memory devices 140-1a-n, 140-2 and/or provide a specially-structured interface via which a party to a cyber risk underwriting contract may obtain, verify, and/or modify cyber insurance data, such as "dark web" and/or other cyber threat data (e.g., assessments, status), with respect to the cyber asset 108.

Fewer or more components 102a-n, 104, 106, 108, 110, 140-1a-n, 140-2 and/or various configurations of the depicted components 102a-n, 104, 106, 108, 110, 140-1a-n, 140-2 may be included in the system 100 without deviating from the scope of embodiments described herein. In some embodiments, the components 102a-n, 104, 106, 108, 110, 140-1a-n, 140-2 may be similar in configuration and/or functionality to similarly named and/or numbered components as described herein. In some embodiments, the system 100 (and/or portion thereof) may comprise a blockchain-based cyber threat management program, system, and/or platform programmed and/or otherwise configured to execute, conduct, and/or facilitate the methods 500, 600 of FIG. 5 and/or FIG. 6 herein, and/or portions or combinations thereof.

The node devices 102a-n, in some embodiments, may comprise any types or configurations of computing, mobile electronic, network, user, and/or communication devices that are or become known or practicable. The node devices 102a-n may, for example, comprise one or more Personal Computer (PC) devices, computer workstations (e.g., an underwriter workstation), tablet computers, such as an iPad® manufactured by Apple®, Inc. of Cupertino, CA, and/or cellular and/or wireless telephones, such as an iPhone® (also manufactured by Apple®, Inc.) or an LG Optimus™ Zone™ 3 smart phone manufactured by LG® Electronics, Inc. of San Diego, CA, and running the Android® operating system from Google®, Inc. of Mountain View, CA. In some embodiments, the node devices 102a-n may comprise devices owned and/or operated by one or more users, such as cyber insurance agents, underwriters, account managers, agents/brokers, customer service representatives, data acquisition partners (e.g., "dark web" monitoring services), and/or consultants or service providers, and/or cyber risk and/or underwriting product customers (or potential customers, e.g., contractors). According to some embodiments, the node devices 102a-n may communicate with the server device 110 via the network 104 to conduct cyber risk underwriting inquiries and/or processes and/or to assess, evaluate, and/or manage (e.g., disable) the cyber asset 108, in accordance with a distributed chain code execution process as described herein. According to some embodiments, any of the node devices 102a-n may be communicatively coupled to the cyber asset 108. A first node device 102a may, for example, be in communication with, reside and/or be located on or at, be hosted by, and/or may comprise the cyber asset 108.

In some embodiments, the node devices 102a-n may interface with the server device 110 and/or the third-party device 106 to effectuate communications (direct or indirect) with one or more other node devices 102a-n (such communication not explicitly shown in FIG. 1) operated by other users and/or with the cyber asset 108. In some embodiments, the node devices 102a-n may interface with the server device 110 to effectuate communications (direct or indirect) with the third-party device 106 (such communication also not explicitly shown in FIG. 1). In some embodiments, the node devices 102a-n and/or the server device 110 may execute separate instances of a chain code algorithm that cause a cyber risk contract ledger to be distributed in an encrypted and verifiable manner. As described herein, for example, the node devices 102a-n and/or the server device 110 may communicate with the third-party device 106 to identify data descriptive of the cyber asset 108 and to execute a cryptographic service utilized to securely disseminate a cyber risk contract chain code block or payload (e.g., containing the data descriptive of the cyber asset 108) to a plurality of the node devices 102a-n.

The network 104 may, according to some embodiments, comprise a Local Area Network (LAN; wireless and/or wired), cellular telephone, Bluetooth®, Near Field Communication (NFC), and/or Radio Frequency (RF) network with communication links between the server device 110, the node devices 102a-n, the third-party device 106, and/or the memory devices 140-1a-n, 140-2. In some embodiments, the network 104 may comprise direct communications links between any or all of the components 102a-n, 106, 108, 110, 140-1a-n, 140-2 of the system 100. The node devices 102a-n may, for example, be directly interfaced or connected to one or more of the server device 110 and/or the management device 106 via one or more wires, cables, wireless links, and/or other network components, such network components (e.g., communication links) comprising portions of the network 104. In some embodiments, the network 104 may comprise one or many other links or network components other than those depicted in FIG. 1. The node devices 102a-n may, for example, be connected to the server device 110 and/or the third-party device 106 via various cell towers, routers, repeaters, ports, switches, and/or other network components that comprise the Internet and/or a cellular telephone (and/or Public Switched Telephone Network (PSTN)) network, and which comprise portions of the network 104.

While the network 104 is depicted in FIG. 1 as a single object, the network 104 may comprise any number, type, and/or configuration of networks that is or becomes known or practicable. According to some embodiments, the network 104 may comprise a conglomeration of different sub-networks and/or network components interconnected, directly or indirectly, by the components 102a-n, 106, 108, 110, 140-1a-n, 140-2 of the system 100. The network 104 may comprise one or more cellular telephone networks with communication links between the node devices 102a-n and the server device 110, for example, and/or may comprise the Internet, with communication links between the server device 110 and the third-party device 106 and/or one or more of the memory devices 140-1a-n, 140-2, for example.

The third-party device 106, in some embodiments, may comprise any type or configuration of a computerized processing device, such as a PC, laptop computer, computer server, database system, and/or other electronic device, devices, or any combination thereof. In some embodiments, the third-party device 106 may be owned and/or operated by a third-party (i.e., an entity different than any entity owning and/or operating either the node devices 102a-n or the server device 110; such as certificate, orderer, authentication and/or cryptographic service provider, a "dark web" monitoring service, a cyber threat assessment service, etc.). The third-party device 106 may, for example, execute one or more web services that provide for (i) automated cyber risk assessments (e.g., of the cyber asset 108; such as may be provided by BitSight™ Technologies, Inc. of Boston, MA), (ii) automated "dark web" monitoring processes, (iii) cyber asset 108 status monitoring, characterization, valuation, and/or management, and/or (iv) centralized blockchain cryptographic functionality, such as the Hyperledger™ Fabric™ blockchain framework available from The Linux Foundation® of San Francisco, CA. In some embodiments, the third-party device 106 may receive blockchain data from one or more of the node devices 102a-n and/or the server device 110, may apply a hash algorithm to the received data, and may transmit the encrypted data to each of the node devices 102a-n and the server device 110 (e.g., for storage in local copies of a blockchain ledger). According to some embodiments, the third-party device 106 may comprise a plurality of devices and/or may be associated with a plurality of third-party entities.

According to some embodiments, the cyber asset 108 may comprise any type, quantity, and/or configuration of IT and/or network components, devices, and/or objects that have value. The cyber asset 108 may comprise, but is not limited to, for example, (i) a file, (ii) a database, (iii) a memory device, (iv) a website, (v) a communications and/or computer port, (vi) a network switch (and/or other network device), (vii) a firewall, (viii) a computer, (ix) a domain name, (x) an Internet Protocol (IP) address, and/or a (xi) Uniform Resource Locator (URL) address. In some embodiments, one or more of the nodes 102a-n may comprise, be in communication with, and/or be otherwise assigned to or associated with the cyber asset 108. In the case that the cyber asset 108 comprises a network location, such as a domain, URL, and/or IP address, for example, one or more of the nodes 102a-n (and/or the server device 110) may be located at and/or addressable via the network location/cyber asset 108.

In some embodiments, the server device 110 may comprise an electronic and/or computerized controller device, such as a computer server communicatively coupled to interface with the node devices 102a-n and/or the third-party device 106 (directly and/or indirectly). The server device 110 may, for example, comprise one or more PowerEdge™ R830 rack servers manufactured by Dell®, Inc. of Round Rock, TX, which may include one or more Twelve-Core Intel® Xeon® E5-4640 v4 electronic processing devices. In some embodiments, the server device 110 may comprise a plurality of processing devices specially-programmed to execute and/or conduct processes that are not practicable without the aid of the server device 110. The server device 110 may, for example, execute one or more coded rules to manage a blockchain ledger for a plurality of cyber insurance contracts, and/or provide real-time cyber risk assessment, monitoring, and/or reporting, which would not be capable of being conducted without the benefit of the specially-programmed server device 110. According to some embodiments, the server device 110 may be located remotely from one or more of the node devices 102a-n and/or the third-party device 106. The server device 110 may also or alternatively comprise a plurality of electronic processing devices located at one or more various sites and/or locations.

According to some embodiments, the server device 110 may store and/or execute specially programmed instructions to operate in accordance with embodiments described herein. The server device 110 may, for example, execute one or more programs, modules, and/or routines that facilitate the provision and/or sales of cyber insurance products, e.g., in an online environment. According to some embodiments, the server device 110 may comprise a computerized processing device, such as a computer server and/or other electronic device, to manage and/or facilitate transactions and/or communications regarding the node devices 102a-n. An insurance company employee, agent, claim handler, underwriter, and/or other user (e.g., customer, contractor, client, or company) may, for example, utilize the server device 110 to (i) receive a request for a cyber risk insurance policy and/or underwriting product (e.g., a quote, purchase, and/or claim), (ii) price and/or underwrite one or more cyber risk underwriting products, (iii) query the third-party device 106 for a cyber risk rating of the cyber asset 108, (iv) generate and/or update a smart contract and/or blockchain ledger descriptive of the underwriting product, (v) monitor the cyber asset 108 for cyber threats/events, (vi) report a cyber threat/event, (vii) automatically disable the cyber asset 108, and/or (viii) provide an interface via which the contractor/client may manage the cyber threat exposure of the cyber asset 108 in real-time, as described herein.

In some embodiments, the node devices 102a-n, the third-party device 106, and/or the server device 110 may be in communication with the memory devices 140-1a-n, 140-2. The memory devices 140-1a-n, 140-2 may comprise, for example, various databases and/or data storage mediums that may store, for example, cyber asset 108 data, cyber threat data, contractor/client preference and/or characteristics data, historic cyber threat/event data, geolocation data, and/or business classification data, historic cyber threat metrics (e.g., statistics) defined by the server device 110, cyber threat processing rules, chain code instructions, blockchain data, cryptographic keys and/or data, login and/or identity credentials, and/or instructions that cause various devices (e.g., the server device 110, the third-party device 106, and/or the node devices 102a-n) to operate in accordance with embodiments described herein.

The memory devices 140-1a-n, 140-2 may store, for example, blockchain data defining a distributed cyber insurance policy/smart contract ledger, chain code instructions, data that causes communications with the third-party device 106 (e.g., an API and/or API tunnel to a web service that provides cyber threat monitoring, blockchain authentication, certification, and/or cryptographic hashing). In some embodiments, the memory devices 140-1a-n, 140-2 may comprise any type, configuration, and/or quantity of data storage devices that are or become known or practicable. The memory devices 140-1a-n, 140-2 may, for example, comprise an array of optical and/or solid-state hard drives configured to store cyber insurance ledger data provided by (and/or requested by) the node devices 102a-n, cyber assessment analysis data (e.g., analysis formulas and/or mathematical models), and/or various operating instructions, drivers, etc. While the memory devices 140-1a-n, 140-2 are depicted as stand-alone components of the various node devices 102a-n and the server 110, the memory devices 140-1a-n, 140-2 may comprise multiple components. In some embodiments, multi-component memory devices 140-1a-n, 140-2 may be distributed across various devices and/or may comprise remotely dispersed components. Any or all of the node devices 102a-n, the third-party device 106, and/or the server 110 may comprise the memory devices 140-1a-n, 140-2 or a portion thereof, for example.

Figure 2:
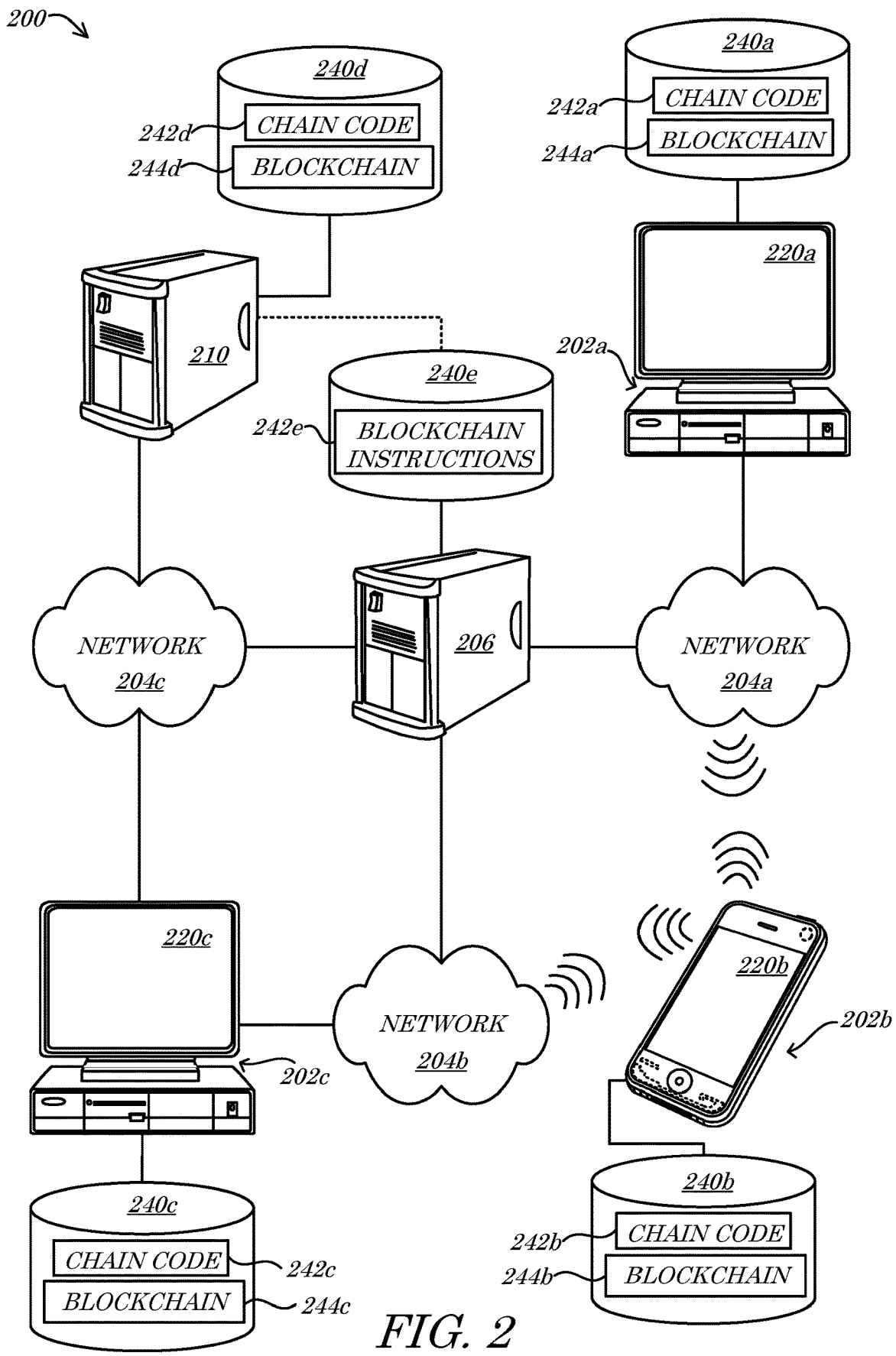
FIG. 2 is a block diagram of a system according to some embodiments.

Turning now to FIG. 2, a block diagram of a system 200 according to some embodiments is shown. In some embodiments, the system 200 may comprise a plurality of node devices 202a-c (e.g., a cyber risk underwriting device 202a, a cyber asset device 202b, and/or a cyber threat assessment device 202c). In some embodiments, the cyber risk underwriting device 202a (e.g., utilized by a cyber risk underwriting entity; not shown) may be in communication via a first network 204a (e.g., the Internet, a cellphone network, and/or a short-range communication network) with the cyber asset device 202b (e.g., utilized by a cyber risk underwriting consumer and/or customer, e.g., that owns one or more cyber assets; not shown). According to some embodiments, the cyber asset device 202b may be in communication via a second network 204b (e.g., the Internet, a cellphone network, and/or a short-range communication network) with the cyber threat assessment device 202c (e.g., utilized by a cyber asset assessment and/or monitoring entity; not shown). In some embodiments, a blockchain services device 206 may be in communication with any or all of the cyber risk underwriting device 202a, the cyber asset device 202b, and/or the cyber threat assessment device 202c, e.g., via the first network 204a and/or the second network 204b. According to some embodiments, the cyber threat assessment device 202c may be in communication with the blockchain services device 206 and/or a cyber risk management device 210, via a third network 204c (e.g., the Internet, a cellphone network, and/or a short-range communication network). According to some embodiments, the system 200 may comprise one or more interfaces 220a-c. Each of the cyber risk underwriting device 202a, the cyber asset device 202b, and/or the cyber threat assessment device 202c may, for example, comprise and/or generate a first, second, or third interface 220a-c, respectively. According to some embodiments, each device 202a-c, 206, 210 may also or alternatively be in communication with and/or comprise a memory device 240a-e (e.g., any of which may be implemented and/or defined by an object data store and/or other data storage technique and/or service, such as utilizing the Amazon® Simple Storage Service (Amazon® S3™) available from Amazon.com, Inc. of Seattle, WA or an open-source third-party database service, such as MongoDB™ available from MongoDB, Inc. of New York, NY).

In some embodiments, each memory device 240a-e may store various instructions and/or data utilized to effectuate blockchain-based cyber threat management, as described herein. First, second, third, and/or fourth memory devices 240a-d coupled (physically and/or communicatively) to the cyber risk underwriting device 202a, the cyber asset device 202b, the cyber threat assessment device 202c, and the cyber risk management device 210, respectively, may store for example, first, second, third, and fourth instances of chain code 242a-d, respectively. The chain code 242a-d may, in some embodiments, comprise specially-coded instructions that cause each respective device 202a-c, 210 to generate and/or update a distributed cyber risk underwriting product/contract ledger. According to some embodiments, a fifth memory device 240e coupled (physically and/or communicatively) to the blockchain services device 206 may store blockchain instructions 242e. The blockchain instructions 242e may comprise, for example, specially-coded instructions that cause the blockchain services device 206 to be responsive to queries and/or data transmissions from any or all of the cyber risk underwriting device 202a, the cyber asset device 202b, the cyber threat assessment device 202c, and the cyber risk management device 210. The blockchain instructions 242e may cause, for example, creation and/or editing of a blockchain 244a-d having instances stored throughout the system 200 (e.g., in each of the first, second, third, and/or fourth memory devices 240a-d). In some embodiments, the blockchain instructions 242e may be accessible and/or executed by the cyber risk management device 210 (e.g., the cyber risk management device 210 may operate in place of or in conjunction with the blockchain services device 206).

According to some embodiments, the blockchain 244a-d may comprise a "private" distributed ledger by being stored only on the devices 202a-c, 210 of the system 200. In some embodiments, the blockchain 244a-d may comprise a "semi-private" or even "public" distributed ledger by including instances stored on additional devices, such as trusted or public devices, respectively (neither of which is shown). According to some embodiments, the chain code 242a-d may include instructions that direct the individual devices 202a-c, 210 to initiate a transmission of cyber risk underwriting product/contract ledger information to the blockchain services device 206 (e.g., via one or more of the networks 204a-c).

The cyber risk underwriting device 202a may, for example, initiate distributed ledger creation by generating an initial or first instance (e.g., a "genesis block") of the blockchain 244a by executing a first instance of the chain code 242a. In the case that the cyber risk underwriting device 202a is utilized to open an account for a new cyber risk underwriting product/contract, for example, information detailing the account/product may be cryptographically hashed or otherwise processed to generate the first instance of the blockchain 244a. In some embodiments, the first instance of the chain code 242a may cause the information detailing the account/product (e.g., received via a first interface 220a) to be transmitted to the blockchain services device 206, e.g., via the first network 204a. The blockchain services device 206 may then, for example, conduct authentication, certification, and/or cryptographic processing of the information received from the cyber risk underwriting device 202a to generate and/or define the first instance of the blockchain 244a. According to some embodiments, the first instance of the blockchain 244a may be transmitted by the blockchain services device 206 to the cyber risk underwriting device 202a, e.g., causing the first instance of the blockchain 244a to be stored in the first memory device 240a.

In some embodiments, the cyber risk underwriting device 202a may transmit (or provide) an indication of the account/product and/or the first instance of the blockchain 244a to the cyber asset device 202b, e.g., via the first network 204a. The cyber risk underwriting device 202a may post the account/product (and/or a quote or instance thereof) to a website (not shown), for example, and the cyber asset device 202b may be utilized to navigate to and view the account/product/quote (e.g., information defining the account/product/quote may be output via a second interface 220b). In some embodiments, the account/product/quote (and/or other cyber risk underwriting data) may be automatically searched, located, identified, and/or sourced or recommended to the cyber asset device 202b. The cyber risk management device 210 may, for example, provide an automatic cyber product search and/or matching service (not explicitly depicted in FIG. 2).

According to some embodiments, such as in the case that a consumer or other entity associated with the cyber asset device 202b desires to obtain the account/product, a second instance of the chain code 242b may be executed. The second instance of the chain code 242b may, for example, cause information detailing a desire to obtain the account/product (e.g., received via the second interface 220b) to be transmitted to the blockchain services device 206, e.g., via the second network 204b. The blockchain services device 206 may then, for example, conduct authentication, certification, and/or cryptographic processing of the information received from the cyber asset device 202b to generate and/or define the second instance of the blockchain 244b. According to some embodiments, the second instance of the blockchain 244b may be transmitted by the blockchain services device 206 to the cyber asset device 202b, e.g., causing the second instance of the blockchain 244b to be stored in the second memory device 240b. The second instance of the blockchain 244b may also or alternatively be transmitted to the cyber risk underwriting device 202a, such that the first instance of the blockchain 244a is overwritten or appended with the encrypted information of the second instance of the blockchain 244b. In such a manner, for example, information based on the second instance of the blockchain 244b may be output via the first interface 220a to alert the cyber risk underwriting entity that a request for the account/product may be forthcoming (and/or has been submitted; e.g., pending cyber risk assessment/review).

In some embodiments, the cyber asset device 202b may transmit (or provide) an indication of the desire to obtain the account/product and/or the second instance of the blockchain 244b to the cyber threat assessment device 202c, e.g., via the second network 204b. In order to apply for and/or obtain the account/product, for example, the consumer may provide input via the second interface 220b that causes the second instance of the chain code 242b to trigger a generation of the second instance of the blockchain 244b and/or to transmit a request for a cyber risk assessment to the cyber threat assessment device 202c. According to some embodiments, certain cyber asset details may be required for submitting a request for a cyber risk assessment and/or for completing a request for the account/product. In some embodiments, a limited or reduced amount of data may be required by the cyber threat assessment device 202c (and/or the cyber risk management device 210) querying stored historic cyber assessment and/or cyber asset data (not shown) to automatically fill in some or many of the required fields on behalf of the consumer.

According to some embodiments, the cyber threat assessment device 202c may generate or prepare a cyber risk assessment (e.g., utilizing data received from the cyber asset device 202b and/or input received via a third interface 220c) and may transmit the assessment to the cyber risk management device 210, e.g., via the third network 204c. In some embodiments, the preparation and/or transmission of the cyber risk assessment may trigger a third instance of the chain code 242c to generate and/or create a third instance of the blockchain 244c. The third instance of the chain code 242c may, for example, cause information detailing the cyber risk assessment for one or more cyber assets (e.g., received via the second interface 220b and/or the third interface 220c) to be transmitted to the blockchain services device 206, e.g., via the second network 204b and/or third network 204c. The blockchain services device 206 may then, for example, conduct authentication, certification, and/or cryptographic processing of the information received from the cyber threat assessment device 202c to generate and/or define the third instance of the blockchain 244c. According to some embodiments, the third instance of the blockchain 244c may be transmitted by the blockchain services device 206 to the cyber threat assessment device 202c, e.g., causing the third instance of the blockchain 244c to be stored in the third memory device 240c. The third instance of the blockchain 244c may also or alternatively be transmitted to the cyber risk underwriting device 202a and/or the cyber asset device 202b, such that the first instance of the blockchain 244a and/or the second instance of the blockchain 244b is overwritten or appended with the encrypted information of the third instance of the blockchain 244c. In such a manner, for example, information based on the third instance of the blockchain 244c may be output via the first interface 220a and/or the second interface 220b to alert the cyber risk underwriting entity and/or the consumer/user, respectively, that an application for a cyber risk underwriting product (e.g., complete with cyber risk assessment) has been submitted.

In some embodiments, the cyber risk management device 210 may receive the cyber risk underwriting product application (and/or the cyber risk assessment) from the cyber threat assessment device 202c and may process the application (utilizing underwriting logic, rules, and/or thresholds; not explicitly depicted in FIG. 2) to derive and/or compute an underwriting decision. According to some embodiments, the underwriting decision may be transmitted to the cyber threat assessment device 202c, the cyber asset device 202b, and/or the cyber risk underwriting device 202a (e.g., via the first, second, and/or third network 204a-c). In some embodiments, the generation and/or transmission of the underwriting decision may trigger a fourth instance of the chain code 242d to generate and/or create a fourth instance of the blockchain 244d. The fourth instance of the chain code 242d may, for example, cause information detailing the approval or denial of a cyber risk underwriting product account/application (e.g., computed by execution of an underwriting logic set) to be transmitted to the blockchain services device 206, e.g., via the third network 204c. The blockchain services device 206 may then, for example, conduct authentication, certification, and/or cryptographic processing of the information received from the cyber risk management device 210 to generate and/or define the fourth instance of the blockchain 244d. According to some embodiments, the fourth instance of the blockchain 244d may be transmitted by the blockchain services device 206 to the cyber risk management device 210, e.g., causing the fourth instance of the blockchain 244d to be stored in the fourth memory device 240d. The fourth instance of the blockchain 244d may also or alternatively be transmitted to the cyber risk underwriting device 202a, the cyber asset device 202b, and/or the cyber threat assessment device 202c, such that the first instance of the blockchain 244a, the second instance of the blockchain 244b, and/or the third instance of the blockchain 244c is overwritten or appended with the encrypted information of the fourth instance of the blockchain 244d. In such a manner, for example, information based on the fourth instance of the blockchain 244d may be output via the first interface 220a, the second interface 220b, and/or the third interface 220c, to alert the cyber risk underwriting entity, the consumer/user, and/or the cyber risk assessment entity, respectively, that the cyber risk underwriting product application has been approved or denied, as the case may be.

According to some embodiments, after the cyber risk underwriting product application has been approved, and, e.g., during the term of the product/account, the cyber threat assessment device 202c may periodically and/or automatically re-evaluate the cyber risk assessment for the one or more cyber assets. Upon conducting a reassessment, the cyber threat assessment device 202c may transmit a notification/report of the reassessment to the cyber risk underwriting device 202a. In some embodiments, the reassessment may comprise an alert and/or indication that there has been (or is currently) a cyber threat event with respect to the one or more cyber assets. The various instances of the blockchain 244a-d may be updated to reflect and/or alert other entities and/or devices 202c, 210 of the reassessment/alert/cyber threat event and/or details thereof. In some embodiments, the system 200 may automatically adjust, block, and/or disable the one or more cyber assets in response to the reassessment. According to some embodiments, the various instances of the blockchain 244a-d may continue to be updated and/or propagated to the various memory devices 240a-d throughout any remaining cyber threat, reassessment, and/or product life-cycle events. In the case that the one or more cyber assets are disabled in response to a cyber threat event, for example, information descriptive of the disabling, damage, incursion, cyber forensics data, etc., may be recorded in the various instances of the blockchain 244a-d. Similarly, the various instances of the blockchain 244a-d may be updated to reflect a remediation of the cyber threat event, addition and/or changes to the one or more cyber assets, premium payments, renewals, cancellation, termination, claims, etc.

Fewer or more components 202a-c, 204a-c, 206, 210, 220a-c, 240a-e, 242a-e, 244a-d and/or various configurations of the depicted components 202a-c, 204a-c, 206, 210, 220a-c, 240a-e, 242a-e, 244a-d may be included in the system 200 without deviating from the scope of embodiments described herein. In some embodiments, the components 202a-c, 204a-c, 206, 210, 220a-c, 240a-e, 242a-e, 244*a-d* may be similar in configuration and/or functionality to similarly named and/or numbered components as described herein. In some embodiments, the system 200 (and/or one or more portions thereof) may comprise a blockchain-based cyber threat management program, system, and/or platform programmed and/or otherwise configured to execute, conduct, and/or facilitate the methods 500, 600 of FIG. 5 and/or FIG. 6 herein, and/or portions or combinations thereof.

Figure 3:
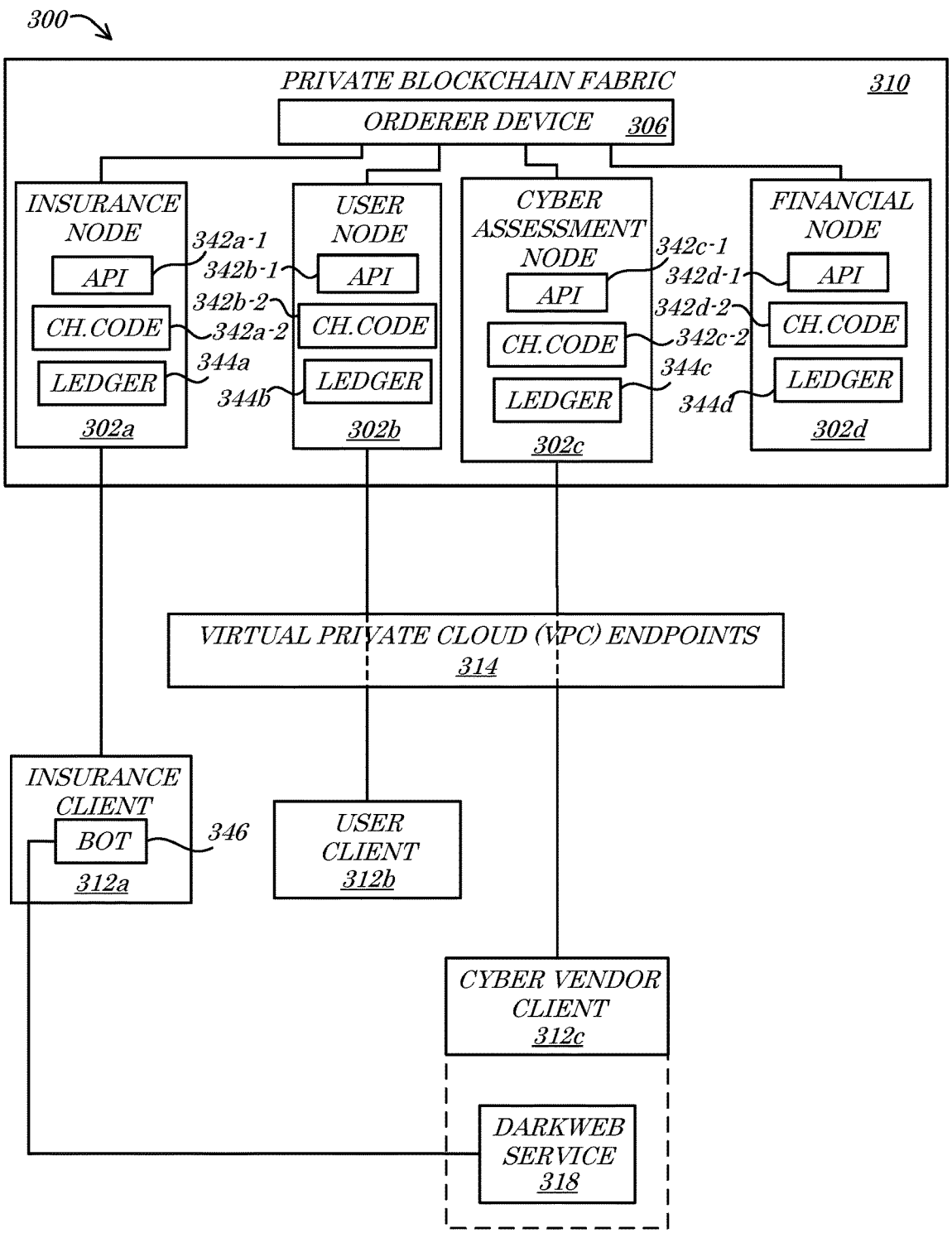
FIG. 3 is a block diagram of a system according to some embodiments.

Referring now to FIG. 3, a block diagram of a system 300 according to some embodiments is shown. In some embodiments, the system 300 may comprise a plurality of node devices 302*a-d* (e.g., an insurance node 302*a*, a user node 302*b*, a cyber assessment node 302*c*, and/or a financial node 302*d*) in communication with an orderer node 306 and comprising and/or in communication via a private blockchain fabric 310. In some embodiments, a plurality of client devices 312*a-c* may be in communication with the node devices 302*a-d*. Some or all of the client devices 312*a-c* may be in direct communication with the node devices 302*a-d* (and/or the private blockchain fabric 310) and/or may be communicatively coupled via one or more Virtual Private Cloud (VPC) endpoints 314. As depicted, for example, a first or insurance client 312*a* may be in communication with the insurance node 302*a*, a second or user client 312*b* may be in communication with the user node 302*b* via the VPC endpoints 314, and/or a third or cyber vendor client 312*c* may be in communication with the cyber assessment node 302*c* via the VPC endpoints 314. In some embodiments, any or all of the nodes 302*a-d* may comprise, store, and/or define one or more Application Programming Interface (API) programs 342*a*-1, 342*b*-1, 342*c*-1, 342*d*-1, chain code instructions 342*a*-2, 342*b*-2, 342*c*-2, 342*d*-2, and/or ledger instances 344*a-d*.

According to some embodiments, the system 300 may be configured and/or utilized to provide, enable, facilitate, and/or conduct blockchain-based cyber threat management as described herein. The user client 312*b* may be utilized, for example, to interact with the user node 302*b* by execution of a second or user API 342*b*-1. The user API 342*b*-1 may comprise, for example, a web application programmed to conduct communications between the nodes 302*a-d* to rate, quote, and/or issue a cyber risk insurance policy (and/or other underwriting product). In some embodiments, the insurance node 302*a* may execute a first or insurance API 342*a*-1 that implements stored rules, logic, and/or instructions to rate, quote, and/or issue the cyber risk insurance policy, e.g., via communications with the user node 302*b* (and/or the user client 312*b*). According to some embodiments, the insurance API 342*a*-1 may incorporate results of a cyber risk assessment and/or other cyber threat analysis data into the rating, quoting, and/or structuring of the cyber risk insurance policy. The insurance API 342*a*-1 may, for example, communicate with the cyber assessment node 302*c* and/or may utilize the insurance client 312*a* to retrieve and/or identify data descriptive of cyber risk metrics for one or more cyber assets (e.g., identified by the user client 312*b*).

In some embodiments, the cyber assessment node 302*c* may execute a third or cyber assessment API 342*c*-1 that conducts cyber risk assessments, e.g., by invoking, executing, and/or communicating with the cyber vendor client 312*c* and/or a darkweb service 318. The darkweb service 318 may comprise, for example, an API programmed to evaluate cyber risk metrics for the cyber asset, such as, but not limited to, network traffic analysis, log file analysis, port data (e.g., open port identification), and/or Distributed Denial-of-Service (DDoS) attack analysis data. In some embodiments, the darkweb service 318 may reside on, be hosted and/or execute by, and/or may otherwise comprise the cyber vendor client 312*c*. According to some embodiments, the cyber vendor client 312*c* and the cyber assessment node 302*c* may conduct an initial cyber assessment for the cyber asset and provide data descriptive of the assessment to the insurance node 302*a* for inclusion in the rating, quoting, and/or product structuring process. In some embodiments, the financial node 302*d* may execute a fourth or financial API 342*d*-1 that may comprise, for example, a payment API, storefront, payment verification and/or authorization service, etc. Upon rating, quoting, structuring, and/or selling of a cyber risk insurance product to (or through) the user, for example, the insurance node 302*a* may call, invoke, and/or hand-off the transaction to the financial node 302*d* to effectuate payment (e.g., premium, deposit, etc.) from the user for the cyber risk insurance product.

According to some embodiments, once initiated/purchased, the cyber risk insurance product may be automatically updated and/or rechecked for cyber risk metrics. The insurance node 302*a* may, in communication with the insurance client 312*a*, for example, execute a "bot" 346 (e.g., an automated process) that periodically and/or automatically invokes and/or initiates the darkweb service 318 to reassess, reevaluate, and/or update one or more status data elements with respect to the cyber asset(s). In some embodiments, such as in the case that a reassessment/check identifies a cyber threat event/incident, the cyber threat event may be automatically reported to the insurance node 302*a*, the user node 302*b*, and/or the financial node 302*d*. Upon detection of a cyber threat event the insurance node 302*a* may confirm coverage for the event (e.g., based on event details) and may automatically, for example, instruct the financial node 302*d* to provide compensation for the cyber threat event. In some embodiments, measures may also or alternately be automatically implemented to reduce potential losses by, e.g., automatically disabling and/or changing settings for the cyber asset(s) to stop the cyber threat event (and/or to prevent additional incursions/issues). These reassessments, identifications of cyber threat events, remediations, etc., and any other transaction data (e.g., the original rating, quoting, structuring, and/or selling) may be appended to the distributed ledger instances 344*a-d* by execution of the various chain code instructions 342*a*-2, 342*b*-2, 342*c*-2, 342*d*-2 in coordination with the orderer device 306. The private blockchain fabric 310 may be utilized, for example, to automatically reassess the cyber asset(s) for cyber risk data/metrics, and to identify, remediate, and/or stop/prevent cyber threat events, while recording such transactions in the distributed ledger 344*a-d*.

Fewer or more components 302*a-d*, 306, 310, 312*a-c*, 314, 318, 342*a*-1, 342*a*-2, 342*b*-1, 342*b*-2, 342*c*-1, 342*c*-2, 342*d*-1, 342*d*-2, 344*a-d*, 346 and/or various configurations of the depicted components 302*a-d*, 306, 310, 312*a-c*, 314, 318, 342*a*-1, 342*a*-2, 342*b*-1, 342*b*-2, 342*c*-1, 342*c*-2, 342*d*-1, 342*d*-2, 344*a-d*, 346 may be included in the system 300 without deviating from the scope of embodiments described herein. In some embodiments, the components 302*a-d*, 306, 310, 312*a-c*, 314, 318, 342*a*-1, 342*a*-2, 342*b*-1, 342*b*-2, 342*c*-1, 342*c*-2, 342*d*-1, 342*d*-2, 344*a-d*, 346 may be similar in configuration and/or functionality to similarly named and/or numbered components as described herein. In some embodiments, the system 300 (and/or one or more portions thereof) may comprise a blockchain-based cyber threat management program, system, and/or platform programmed and/or otherwise configured to execute, conduct, and/or facilitate the methods 500, 600 of FIG. 5 and/or FIG. 6 herein, and/or portions or combinations thereof.

III. Blockchain-Based Cyber Threat Management Data Structure

Figure 4:
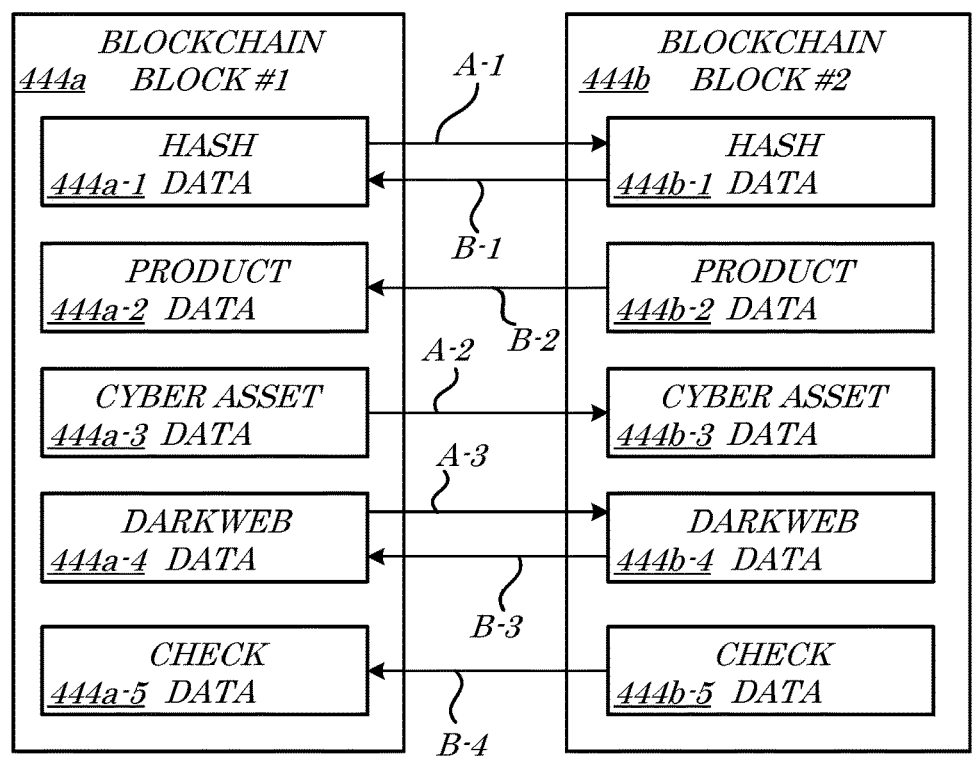
FIG. 4 is an example data storage structure according to some embodiments.

Referring now to FIG. 4, a block diagram of an example data storage structure 440 according to some embodiments is shown. In some embodiments, the data storage structure 440 may comprise a plurality of blockchain data blocks 444a-b defining a distributed cyber risk underwriting product/contract ledger. In some embodiments, the data storage structure 440 may be implemented and/or defined by an object data store and/or other data storage technique and/or service, such as the Amazon® Simple Storage Service (Amazon® S3™) available from Amazon.com, Inc. of Seattle, WA or an open-source third-party database service, such as MongoDB™, available from MongoDB, Inc. of New York, NY.

According to some embodiments, each blockchain data block 444a-b may comprise a plurality of data elements, such as, but not limited to, hash data 444a-1, 444b-1, product (e.g., cyber risk underwriting product) data 444a-2, 444b-2, cyber asset data 444a-3, 444b-3, darkweb data 444a-4, 444b-4, and/or check data 444a-5, 444b-5. In some embodiments, the blockchain data blocks 444a-b may comprise different data elements at different times. In the case that a first blockchain data block 444a comprises a genesis block, for example, the first blockchain data block 444a may initially comprise a first hash stored in the hash data 444a-1, first cyber asset data stored in the cyber asset data 444a-3, and/or first darkweb data stored in the darkweb data 444a-4.

According to some embodiments, the first blockchain data block 444a may be generated, recorded, and/or stored on a first device (not shown) in response to a first cyber risk underwriting product event, such as a quotation of a new account/product (e.g., input provided by a potential consumer and a quote provided in response by an underwriting entity). According to some embodiments, the cyber asset data stored in the cyber asset data 444a-3 may comprise data descriptive of the one or more cyber assets for which at least one of the cyber risk underwriting products is desired (e.g., cyber asset name, identifier, location (e.g., network location), type, etc.). In some embodiments, the first darkweb data stored in the darkweb data 444a-4 may comprise data identifying cyber risk assessment data acquired with respect to the one or more cyber assets. According to some embodiments, each of the cyber asset data 444a-3 and the darkweb data 444a-4 may be encrypted in association with the hash data 444a-1 to define the first blockchain data block 444a, at a first point in time.

In some embodiments, the first blockchain data block 444a and/or elements thereof may be transmitted to a remote and/or second device (not shown) to establish and/or update a second blockchain data block 444b. Upon completion of a cyber risk assessment and/or reassessment of the one or more cyber assets, for example, the second blockchain data block 444b may be created on the second device, thereby establishing a first level of distribution of the cyber risk underwriting product/contract ledger. According to some embodiments for example, the hash data 444a-1 may be transmitted or replicated to record the hash data 444b-1 at "A-1", the cyber asset data 444a-3 may be transmitted or replicated to record the cyber asset data 444b-3 at "A-2", and/or the darkweb data 444a-4 may be transmitted or replicated to record the darkweb data 444b-4 at "A-3".

According to some embodiments, upon occurrence of a second cyber risk underwriting product event, the second blockchain data block 444b may be altered to include first product data stored in the product data 444b-2, second darkweb data stored in the darkweb data 444b-4, and/or first check data stored in the check data 444b-5. In the case that the second cyber risk underwriting product event comprises a detection of a darkweb cyber threat event, for example, the second darkweb data stored in the darkweb data 444b-4 may comprise information identifying the cyber threat event, associated darkweb data, affected cyber assets, mitigation and/or remedial measures. According to some embodiments, the first product data stored in the product data 444b-2 may comprise data descriptive of one or more available types and/or instances (e.g., configurations) of cyber risk underwriting products.

In some embodiments, the second blockchain data block 444b may be utilized to update and/or modify the first blockchain data block 444a. New hash data stored in the hash data 444b-1 may be transmitted or replicated back to the first device to update the hash data 444a-1 at "B-1", for example, and/or the first product data stored in the product data 444b-2 may be transmitted or replicated to record the product data 444a-2 on the first device at "B-2". According to some embodiments, second or updated darkweb data stored in the darkweb data 444b-4 may be transmitted or replicated to the first device to update the darkweb data 444a-4 at "B-3". In some embodiments, the blockchain data blocks 444a-b (and/or data elements therein) may be appended, combined, stacked, concatenated, added, and/or otherwise joined or stored in relation to one another. According to some embodiments, the first blockchain data block 444a may be tied to the second blockchain data block 444b by transmission or replication of the first check data stored in the check data 444b-5 to the first device to record the check data 444a-5 at "B-4. The check data 444a-5, 444b-5 may comprise, for example, data, such as a timestamp, additional cryptographic data, and/or information identifying or describing the second cyber risk underwriting product event, such that an analysis of the first blockchain data block 444a (and/or the check data 444a-5 thereof) will identify that the second blockchain data block 444b should be stored in relation to the first blockchain data block 444a.

In some embodiments, fewer or more data fields, types, and/or configurations than are depicted in FIG. 4 may be associated with the blockchain data blocks 444a-b. Only a portion of one or more databases, data blocks, and/or other data stores is necessarily shown in FIG. 4, for example, and other database fields, columns, structures, orientations, quantities, and/or configurations may be utilized without deviating from the scope of some embodiments. Further, the data shown in the various data fields is provided solely for exemplary and illustrative purposes and does not limit the scope of some embodiments described herein. In some embodiments, the blockchain data blocks 444a-b may not comprise distinct and/or separate data elements but may instead comprise a Binary Large Object ("BLOB") and/or data package or string, such as may be structured in accordance with an open-standard file format, such as JavaScript Object Notation ("JSON").

IV. Blockchain-Based Cyber Threat Management Processes

Figure 5:
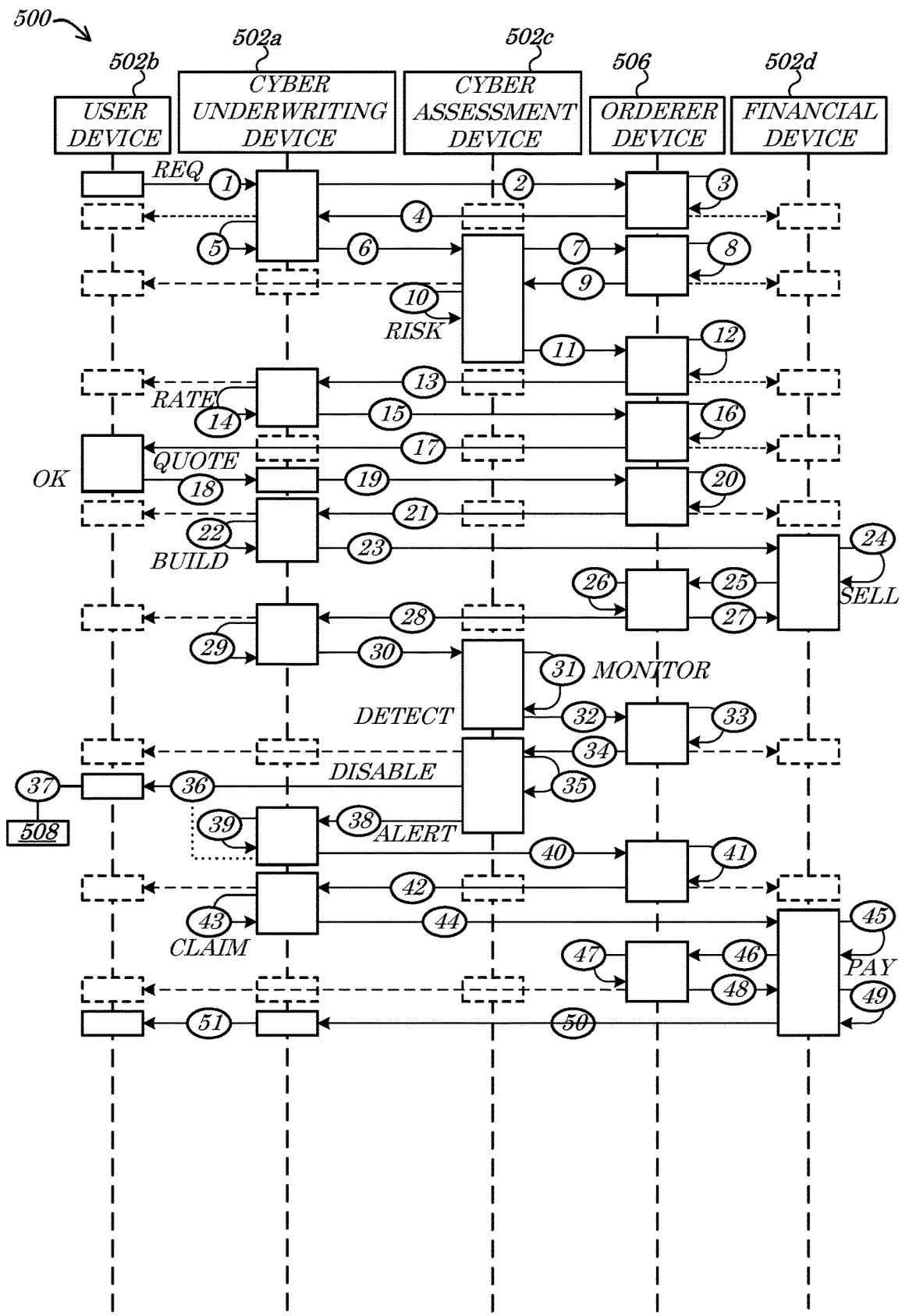
FIG. 5 is a systemic flow diagram of a method according to some embodiments.

Referring now to FIG. 5, a systemic flow diagram of a process or method 500 according to some embodiments, is shown. The method 500 may, for example, be executed by various hardware and/or logical components via interactive communications, involving communications between various node devices 502a-d, such as a cyber underwriting device 502a, a user device 502b, a cyber assessment device 502c, a financial device 502d, and/or an orderer device 506. While not explicitly depicted in FIG. 5, the devices 502a-d, 506 may be in communication via various networks and/or network components, and/or may process received data by executing chain code instructions via one or more electronic processing devices.

The process diagrams and flow diagrams described herein do not necessarily imply a fixed order to any depicted actions, steps, and/or procedures, and embodiments may generally be performed in any order that is practicable unless otherwise and specifically noted. While the order of actions, steps, and/or procedures described herein is generally not fixed, in some embodiments, actions, steps, and/or procedures may be specifically performed in the order listed, depicted, and/or described and/or may be performed in response to any previously listed, depicted, and/or described action, step, and/or procedure. Any of the processes and methods described herein may be performed and/or facilitated by hardware, software (including microcode), firmware, or any combination thereof. For example, a storage medium (e.g., a hard disk, Random Access Memory (RAM) device, cache memory device, Universal Serial Bus (USB) mass storage device, and/or Digital Video Disk (DVD); e.g., the memory devices 140-1a-n, 140-2, 240a-e, 440, 840, 940a-e of FIG. 1, FIG. 2, FIG. 4, FIG. 8, FIG. 9A, FIG. 9B, FIG. 9C, FIG. 9D, and/or FIG. 9E herein) may store thereon instructions that when executed by a machine (such as a computerized processor) result in performance according to any one or more of the embodiments described herein.

In some embodiments, the method 500 (e.g., for managing a distributed cyber insurance policy contract ledger and/or cyber threat status) may begin at "1" with a transmitting of a request for a quote and/or sale of a cyber risk underwriting product (e.g., a cyber risk insurance policy) by the user device 502b. In some embodiments, the request or transmitting at "1" may comprise a transmission of data descriptive of a cyber asset 508 to the cyber underwriting device 502a (and accordingly the receipt of the information thereof). In some embodiments, the cyber underwriting device 502a may forward and/or transmit an indication of the request to the orderer device 506, at "2". The transmitting at "2" may, in some embodiments, result from an automatic activation of a hard-coded network address or remote identifier of the orderer device 506 embedded within and/or accessible to chain code application instructions executed by the cyber underwriting device 502a. The orderer device 506 may, in some embodiments, generate a genesis or initial blockchain at "3" based on the cyber asset (and/or other user) data and/or may publish, forward, and/or transmit the initial blockchain data back to the cyber underwriting device 502a, at "4". As depicted with respect to the initial blockchain data at "4", and as repeated throughout the example depiction of the method 500, in some embodiments the blockchain data may also or alternatively be published, posted, and/or transmitted to one or more of the user device 502b, cyber assessment device 502c, and/or the financial device 502d (e.g., as depicted by the dotted line boxes and arrows in FIG. 5), with each transmission causing an updating of an instance of the blockchain stored in each respective device 502a-d). In some embodiments, an instance of the blockchain stored on (or by) the cyber underwriting device 502a may be updated by chain code executed on or by the cyber underwriting device 502a in response to the receiving of the request transmitted at "1" and/or in response to receiving the initial blockchain data from the orderer device 506 at "4". According to some embodiments, the cyber underwriting device 502a may, upon receiving, storing, and/or processing the initial blockchain data and/or in response to the receiving of the request, generate a cyber risk assessment request, at "5". In some embodiments, the cyber risk assessment request may be transmitted and/or forwarded to the cyber assessment device 502c, at "6" and/or the cyber risk assessment request (e.g., an indication thereof) may be transmitted to the orderer device 506, at "7".

According to some embodiments, the orderer device 506 may add to or alter the genesis block and/or initial blockchain with data representative of the cyber risk assessment request, at "8". In some embodiments, the orderer device 506 may publish, forward, and/or transmit the updated blockchain data to the cyber assessment device 502c (and/or other devices 502a-b, 502d), at "9". According to some embodiments, an instance of the blockchain stored on (or by) the cyber assessment device 502c may be updated by chain code executed on or by the cyber assessment device 502c in response to the receiving of the cyber risk assessment request transmitted at "6" and/or in response to receiving the updated blockchain data from the orderer device 506 at "9". In some embodiments, the cyber assessment device 502c may (e.g., after receiving the cyber risk assessment request) conduct a cyber risk/threat assessment of the cyber asset 508, at "10". The cyber risk assessment may, for example, identify various "red flags", such as settings and/or metrics that are identified to be outside of acceptable bounds/ranges and/or may define an overall estimated risk level for the cyber asset 508. According to some embodiments, the cyber assessment device 502c may forward and/or transmit an indication of the assessment/risk analysis to the orderer device 506, at "11". According to some embodiments, the orderer device 506 may add to or alter the blockchain with data representative of the cyber risk assessment/risk analysis, at "12". In some embodiments, the orderer device 506 may publish, forward, and/or transmit the updated blockchain data to the cyber underwriting device 502a (and/or other devices 502b-d), at "13".

In some embodiments, an instance of the blockchain stored on (or by) the cyber underwriting device 502a may be updated by chain code executed on or by the cyber underwriting device 502a in response to the receiving of the cyber risk assessment/risk analysis data transmitted at "13". In some embodiments, the cyber underwriting device 502a may process the cyber risk assessment/risk analysis data (and/or other underwriting data) by executing and/or implementing underwriting rules and/or logic to rate a policy for the cyber asset 508, at "14". According to some embodiments, the processing at "14" may comprise a computation of an underwriting decision, such as a decision to accept, decline, and/or modify the request (e.g., an application for the cyber risk underwriting product/policy received via the request at "1"). In some embodiments, the cyber underwriting device 502a may forward and/or transmit an indication of the underwriting decision and/or rating to the orderer device 506, at "15". According to some embodiments, the orderer device 506 may add to or alter the blockchain with data representative of the underwriting decision and/or rating, at "16". In some embodiments, the orderer device 506 may publish, forward, and/or transmit the updated blockchain data to the user device 502b (and/or other devices 502a, 502c-d), at "17". As shown for exemplary purposes in FIG. 5, in the case the underwriting decision is to accept the application/request, the data indicative of the underwriting decision transmitted to the user device 502b at "17" may comprise a quote for the cyber risk underwriting product/policy. In some embodiments, such as in the case that a user (not shown; e.g., a consumer or agent/broker) accepts the quote (e.g., "OK"), the user device 502b may transmit an indication of the acceptance to the cyber underwriting device 502a, at "18". According to some embodiments, the cyber underwriting device 502a may forward and/or transmit an indication of the acceptance of the quote to the orderer device 506, at "19". According to some embodiments, the orderer device 506 may add to or alter the blockchain with data representative of the acceptance of the quote, at "20". In some embodiments, the orderer device 506 may publish, forward, and/or transmit the updated blockchain data to the cyber underwriting device 502a (and/or other devices 502b-d), at "21".

According to some embodiments, an instance of the blockchain stored on (or by) the cyber underwriting device 502a may be updated by chain code executed on or by the cyber underwriting device 502a in response to the receiving of the acceptance of the quote transmitted at "18" and/or in response to receiving the updated blockchain data from the orderer device 506 at "21". In some embodiments, the cyber underwriting device 502a may generate and/or create cyber risk underwriting product policy data, rules, conditions, and/or documents, such as a power of attorney, an issuance package, and/or policy conditions and/or rules, at "22". In some embodiments, the cyber underwriting device 502a may transmit the cyber risk underwriting product policy data, rules, conditions, and/or documents to the financial device 502d for execution, billing, and/or sales processing, at "23". In some embodiments, the financial device 502d may execute a sale of the cyber risk underwriting product to the user (and/or consumer/insured), e.g., by processing payment information of the user (e.g., received as part of the request at "1" and/or as part of the acceptance of the quote at "18), at "24". According to some embodiments, the financial device 502d may forward and/or transmit an indication of the sale to the orderer device 506, at "25". According to some embodiments, the orderer device 506 may add to or alter the blockchain with data representative of the sale, at "26". In some embodiments, the orderer device 506 may publish, forward, and/or transmit the updated blockchain data to the financial device 502d, at "27", and/or to the cyber underwriting device 502a (and/or other devices 502b-c), at "28". According to some embodiments, an instance of the blockchain stored on (or by) the financial device 502d may be updated by chain code executed on or by the financial device 502d in response to the receiving of the cyber risk underwriting product policy data, rules, conditions transmitted at "23" and/or in response to receiving the updated blockchain data from the orderer device 506 at "27".

In some embodiments, an instance of the blockchain stored on (or by) the cyber underwriting device 502a may be updated by chain code executed on or by the cyber underwriting device 502a in response to the receiving of an indication of the sale (e.g., a payment receipt, acknowledgement, etc.) and/or the updated blockchain data from the orderer device 506 at "28". According to some embodiments, the cyber underwriting device 502a may process data descriptive of the payment/sale confirmation/authorization to execute one or more policy/product procedures, at "29". The cyber underwriting device 502a may, for example, initiate and/or execute a "bot", loop, and/or other program that continually updates a status for, checks a status of, and/or evaluates one or more conditions for the policy/product (and/or the cyber asset 508 thereof). According to some embodiments, the cyber underwriting device 502a may transmit a request for reassessment and/or monitoring of the cyber asset 508 to the cyber assessment device 502c, at "30". In some embodiments, the cyber assessment device 502c may, in response to the request at "30" for example, monitor, reassess, reevaluate, and/or update a status of the cyber asset 508, at "31". According to some embodiments, this monitoring may continue and/or be repeated (e.g., periodically, randomly, and/or in response to trigger events) until (i) an expiration of the product/policy and/or (ii) a cyber threat event detection.

As shown for exemplary purposes in FIG. 5, in the case that a cyber threat event is detected, the cyber assessment device 502c may forward and/or transmit data indicative of the detected cyber threat event to the orderer device 506, at "32". According to some embodiments, the orderer device 506 may add to or alter the blockchain with data representative of the cyber threat event, at "33". In some embodiments, the orderer device 506 may publish, forward, and/or transmit the updated blockchain data to the cyber assessment device 502c (and/or other devices 502a-b, 502d), at "34". According to some embodiments, an instance of the blockchain stored on (or by) the cyber assessment device 502c may be updated by chain code executed on or by the cyber assessment device 502c in response to the detection of the cyber threat event and/or in response to receiving the updated blockchain data from the orderer device 506 at "34".

According to some embodiments, the cyber assessment device 502c may process data descriptive of the cyber threat event, e.g., by application of stored rules and/or logic to determine a remediation and/or response action, such as, but limited to, disabling the cyber asset 508, editing one or more settings of the cyber asset 508, and/or restricting network access to and/or from the cyber asset 508, at "35". As shown for exemplary purposes in FIG. 5, the cyber assessment device 502c may, for example, transmit a command (and/or an alert) to the user device 502b (and/or directly to the cyber asset 508 and/or a device associated therewith; not separately shown) requesting and/or causing a disabling (and/or other remedial and/or response action) of the cyber asset 508, at "36". In some embodiments, the transmitted command, data, and/or request may be implemented and/or responded to by an adjustment being made to the cyber asset 508, at "37". The user device 502b may, for example, change a DNS setting, URL, access credential, network path, security setting, power setting, etc., of the cyber asset 508, e.g., to stop, minimize, and/or prevent additional cyber threat event activities.

In some embodiments, the cyber assessment device 502c may transmit an alert descriptive of the cyber threat event to the cyber underwriting device 502a, at "38". According to some embodiments, the cyber underwriting device 502a may process the alert (and/or data descriptive of the cyber threat event) utilizing stored rules, logic, and/or instructions to determine whether the cyber threat event meets a predefined condition, at "39". In some embodiments, the cyber underwriting device 502a may proceed back to (and/or replace) "36" by transmitting a command, request, etc., to the user device 502b to, e.g., disable and/or otherwise affect the cyber asset 508 based on the analysis of the cyber threat event with respect to the condition. According to some embodiments, the cyber underwriting device 502a may forward and/or transmit data indicative of the analysis of the cyber threat event with respect to the condition to the orderer device 506, at "40". According to some embodiments, the orderer device 506 may add to or alter the blockchain with data representative of the analysis of the cyber threat event with respect to the condition, at "41". In some embodiments, the orderer device 506 may publish, forward, and/or transmit the updated blockchain data to the cyber underwriting device 502a (and/or other devices 502b-d), at "42". According to some embodiments, an instance of the blockchain stored on (or by) the cyber underwriting device 502*a* may be updated by chain code executed on or by the cyber underwriting device 502*a* in response to the analysis of the cyber threat event with respect to the condition at "39" and/or in response to receiving the updated blockchain data from the orderer device 506 at "42".

According to some embodiments, the cyber underwriting device 502*a* may, e.g., based on the analysis of the cyber threat event with respect to the condition, compute a cyber risk underwriting product claim decision/determination, at "43". The cyber risk underwriting product claim decision/ determination may, for example, comprise a determination that a payment should be made to the user/account holder based on the detected cyber threat event with respect to the cyber asset 508. According to some embodiments, the decision may comprise a computation and/or calculation of a payment amount, e.g., based on details of the cyber asset 508 and/or of the cyber threat event (e.g., a magnitude of the cyber threat event, estimate of computer network damage and/or data loss, etc.). In some embodiments, the cyber underwriting device 502*a* may transmit an indication of the claim determination and/or payment amount (e.g., an alert, authorization, and/or command) to the financial device 502*d*, at "44".

In some embodiments, the financial device 502*d* may execute a payment of the cyber risk underwriting product claim to the user (and/or consumer/insured), e.g., by processing payment information, at "45". According to some embodiments, the financial device 502*d* may forward and/or transmit an indication of the payment to the orderer device 506, at "46". According to some embodiments, the orderer device 506 may add to or alter the blockchain with data representative of the payment (and/or claim determination), at "47". In some embodiments, the orderer device 506 may publish, forward, and/or transmit the updated blockchain data to the financial device 502*d* (and/or other devices 502*a-c*), at "48". According to some embodiments, an instance of the blockchain stored on (or by) the financial device 502*d* may be updated by chain code executed on or by the financial device 502*d* in response to the conducting of the payment and/or in response to receiving the updated blockchain data from the orderer device 506 at "48". In some embodiments, the financial device 502*d* may forward and/or transmit confirmation of the payment to the cyber underwriting device 502*a* at "50" and the cyber underwriting device 502*a* and/or the financial device 502*d* may forward and/or transmit confirmation of the payment (and/or payment details) to the user device 502*b*, at "51".

While many specific actions of the method 500 have been described with respect to FIG. 5, fewer or more actions, transmissions, and/or processing procedures may be implemented in the method 500 without deviating from embodiments herein. According to some embodiments, any transmission sent from an origin to a destination may be received by and/or at the destination, e.g., in response to the transmission. In some embodiments, fewer or more components 502*a-d*, 506, 508 and/or various configurations of the depicted components 502*a-d*, 506, 508 may be included in the method 500 without deviating from the scope of embodiments described herein. In some embodiments, the components 502*a-d*, 506, 508 may be similar in configuration and/or functionality to similarly named and/or numbered components as described herein. In some embodiments, the method 500 (and/or one or more portions thereof) may comprise a blockchain-based cyber threat management program, system, and/or platform programmed and/or otherwise configured to execute, conduct, and/or facilitate the method 600 of FIG. 6 herein, and/or portions or combinations thereof.

Figure 6:
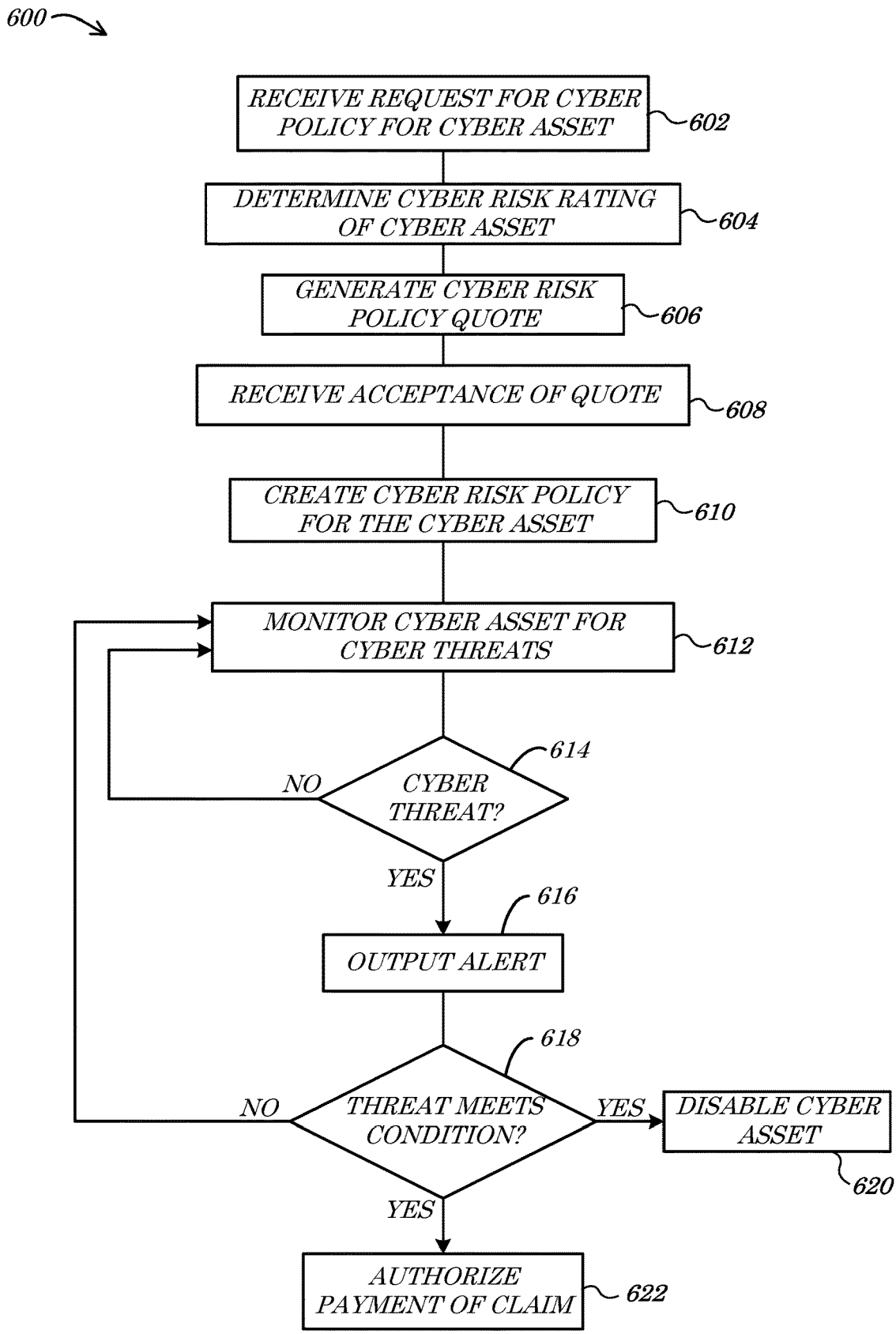
FIG. 6 is a flow diagram of a method according to some embodiments.

Referring now to FIG. 6, a flow diagram of a method 600 according to some embodiments is shown. In some embodiments, the method 600 may be performed and/or implemented by and/or otherwise associated with one or more specialized and/or specially-programmed computers (e.g., the node devices 102*a-n*, 202*a-c*, 302*a-d*, 502*a-d*, the third-party, blockchain services, and/or orderer devices 106, 206, 306, 506 and/or the server, cyber risk management, private blockchain fabric devices, and/or apparatus 110, 210, 310, 810, all of FIG. 1, FIG. 2, FIG. 3, FIG. 5, and/or FIG. 8 herein), computer terminals, computer servers, computer systems and/or networks, and/or any combinations thereof (e.g., by one or more multi-threaded and/or multi-core processing units of a cyber risk management system). In some embodiments, the method 600 may be embodied in, facilitated by, and/or otherwise associated with various input mechanisms and/or interfaces (e.g., the interfaces 720*a-c*, 820 of FIG. 7A, FIG. 7B, FIG. 7C, and/or FIG. 8 herein).

According to some embodiments, the method 600 may comprise receiving (e.g., by a processing device and/or via an electronic communication network) a request for a cyber risk insurance policy for a cyber asset, at 602. The cyber risk insurance policy (and/or other cyber risk underwriting product/policy) request may, for example, be generated by a remote user device (e.g., a peer device or node in a blockchain fabric) operated by an entity desiring a cyber risk insurance policy (e.g., a customer, potential customer, and/or consumer). In some embodiments, the cyber risk insurance policy request may comprise a request for one or more specific types and/or configurations of cyber risk underwriting products. According to some embodiments, the cyber risk insurance policy request may include details of one or more cyber assets to be covered (e.g., vulnerability descriptions, first seen date, last seen date, network port number, etc.), details defining the owner of the cyber asset(s), an amount of desired coverage, and/or a coverage date/time/range. In some embodiments, a cyber risk insurance policy application or request package may be received. Such a package or submission may comprise, for example, various documentation, access credentials, identifiers (e.g., a domain name, URL, and/or IP address), etc., e.g., descriptive of the cyber asset(s).

According to some embodiments, the cyber risk insurance policy request may be received by an insurance entity and/or device, and/or an agent entity and/or device (e.g., a cyber underwriting API blockchain client device). According to some embodiments, the receiving device may have access to and/or comprise, for example, a data storage device storing (i) chain code instructions, (ii) underwriting instructions, and/or (ii) a blockchain data structure. According to some embodiments, the chain code instructions may be triggered by a receipt of the cyber risk insurance policy request to record information descriptive of the cyber risk insurance policy request in the blockchain data structure. In some embodiments, such as in the case that a centralized blockchain device (e.g., an orderer device) is utilized to provide certification, authentication, and/or cryptographic services, the insurance device (e.g., a peer device or node in the blockchain fabric) may transmit a request to the blockchain device to record the cyber risk insurance policy request data. The insurance device may execute a blockchain application (e.g., an application that executes chain code and calls the blockchain device), for example, that transmits a signal to a network address of the blockchain device. In some embodiments, the blockchain device may receive the cyber risk insurance policy request data, apply a cryptographic algorithm, such as a hash, to the data, and provide the encrypted "block" back to the insurance device. According to some embodiments, the cyber risk insurance policy request information may not be transmitted to the blockchain device, but a call to the blockchain device may cause the cryptographic algorithm to be applied to the data on the insurance device. In the case that data already exists in the blockchain data structure, the cyber risk insurance policy request block may be appended to the end of the previous block. In the case that the cyber risk insurance policy request block is the first block, the cyber risk insurance policy request block may be stored as a genesis block in the blockchain data structure. In some embodiments, different blockchain data structures may be employed for different cyber risk insurance policy requests, cyber assets, customers/consumers, geographic locations, and/or underwriting product transactions.

In some embodiments, the method 600 may comprise determining (e.g., by the processing device) a cyber risk rating for the cyber asset, at 604. The insurance device may, for example, trigger and/or transmit a request for a cyber threat assessment of the cyber asset(s) identified in and/or related to the request/application. According to some embodiments, the insurance device may send a request for a cyber threat assessment and/or rating to a third-party device, such as a cyber assessment vendor server, API, application, etc. (e.g., a cyber risk API blockchain client device; e.g., a peer device or node in the blockchain fabric). According to some embodiments, the cyber threat assessment request may be triggered in response to an execution of cyber risk underwriting instructions, e.g., by the insurance device. In some embodiments, the cyber threat assessment may be conducted by querying the third-party device and/or service (e.g., utilizing data descriptive of the cyber asset(s)) and receiving a response thereto, e.g., that includes data defining a cyber threat assessment score, rating, and/or other data and/or metrics descriptive of, e.g., "red flags" with respect to the cyber asset(s) (e.g., an indication of at least one red flag indicator, such as (i) an open port, (ii) a software vulnerability, (iii) an outdated update sequence, and (iv) an existing infection). In some embodiments, the cyber threat assessment may comprise a search of darkweb data sources with respect to the cyber asset(s). According to some embodiments, such as in the case that a cyber risk assessment has already been conducted with respect to the cyber asset(s), the results of the assessment may be queried, looked-up, and/or retrieved from stored data. In some embodiments, data descriptive of and/or indicative of the cyber threat assessment may be stored in the blockchain, e.g., by execution of the chain code instructions. A cyber threat assessment block may be generated and recorded, for example, by appending it to the cyber risk underwriting policy/product request block in the blockchain data structure. In some embodiments, the cyber risk underwriting policy/product block may be updated to indicate the relationship with the newly-added cyber threat assessment block.

According to some embodiments, the method 600 may comprise generating (e.g., by the processing device) a cyber risk insurance policy quote, at 606. The insurance device may receive an underwriting decision from another device, for example, or may execute stored underwriting rules to compute the underwriting decision, e.g., based on the cyber threat assessment of the cyber asset(s). In some embodiments, the underwriting decision may comprise and/or compute various risk metrics, ratings, deductibles, premiums, etc. In some embodiments, the cyber risk product/policy underwriting decision may comprise a decision to accept, reject, or modify (e.g., a counter-offer) the requested cyber risk product/policy and/or may comprise the quote. In some embodiments, data descriptive of and/or indicative of the underwriting decision/quote may be stored in the blockchain, e.g., by execution of the chain code instructions. An underwriting decision/quote block may be generated and recorded, for example, by appending it to the cyber threat assessment block in the blockchain data structure. In some embodiments, the cyber threat assessment block may be updated to indicate the relationship with the newly-added underwriting decision/quote block.

In some embodiments, the method 600 may comprise receiving (e.g., by a processing device and/or via an electronic communication network) an acceptance of the quote, at 608. The quote/underwriting decision may be transmitted to the consumer/user (e.g., to the remote user device) by the insurance device, for example, and a decision to accept, deny, and/or counter-offer the quote may be input by the user and transmitted back to the insurance device (e.g., in response to the receiving of the quote). In some embodiments, an indication of the acceptance of the quote may be received by the insurance device and may comprise, for example, a payment authorization, payment details/identifiers, signed documents, waivers, powers of attorney, etc. In some embodiments, data descriptive of and/or indicative of the acceptance of the quote (or the denial and/or counter-offer, as the case may be) may be stored in the blockchain, e.g., by execution of the chain code instructions. A quote acceptance block may be generated and recorded, for example, by appending it to the underwriting decision/quote block in the blockchain data structure. In some embodiments, the underwriting decision/quote block may be updated to indicate the relationship with the newly-added quote acceptance block.

According to some embodiments, the method 600 may comprise creating (e.g., by the processing device) a cyber risk insurance policy for the cyber asset, at 610. In the case that the quote is accepted, for example, the insurance device may execute the underwriting instructions to define and/or generate various parameters and/or conditions for the cyber risk underwriting product/policy (and check to verify whether such parameters and/or conditions are met). According to some embodiments, product/policy conditions may include, but need not be limited to, a requirement that automatic cyber threat monitoring be permitted for the cyber asset(s), that the cyber asset(s) be managed in a particular best-practice manner, that the cyber asset(s) be maintained free of red flag indicators for a period of time, and/or that certain other IT best practices be implemented. In some embodiments, the creating/generating of the policy/product may comprise selling the policy/product to the user (e.g., accepting payment in exchange for the activation of the policy/product) and/or an identification of policy contacts and/or addresses. In some embodiments, data descriptive of and/or indicative of the acceptance of the cyber risk insurance policy may be stored in the blockchain, e.g., by execution of the chain code instructions. A cyber risk insurance policy block may be generated and recorded, for example, by appending it to the quote acceptance block in the blockchain data structure. In some embodiments, the quote acceptance block may be updated to indicate the relationship with the newly-added cyber risk insurance policy block. In such a manner, for example, the cyber risk insurance policy may be registered with the blockchain system.

In some embodiments, the method 600 may comprise monitoring (e.g., by the processing device) the cyber asset for cyber threats, at 612. The insurance device may execute an automated procedure (e.g., a "bot"), for example, that periodically (e.g., at predefined time intervals, randomly, and/or in response to event triggers) transmits a request to the third-party cyber threat assessment device/service to reassess and/or update a status of the cyber asset(s). In some embodiments, the third-party device/service may otherwise be scheduled and/or automatically triggered to provide cyber threat data with respect to the cyber asset(s) on a recurring basis. According to some embodiments, data descriptive of and/or indicative of the monitoring may be stored in the blockchain, e.g., by execution of the chain code instructions. A monitoring block may be generated and recorded, for example, by appending it to the cyber risk insurance policy block in the blockchain data structure. In some embodiments, the cyber risk insurance policy block may be updated to indicate the relationship with the newly-added monitoring block.

According to some embodiments, the method 600 may comprise determining (e.g., by the processing device) whether there is a cyber threat, at 614. The cyber risk API blockchain client device and/or a cyber threat assessment and/or monitoring service thereof may, for example, identify an occurrence of a cyber threat with respect to the cyber asset(s) by execution of cyber threat monitoring algorithms and/or processes. In some embodiments, an indication of the threat may be provided to the insurance device and/or may be identified by the insurance device by execution of monitoring rules that interpret monitoring data provided by the cyber threat monitoring device/service. According to some embodiments, the cyber threat may comprise an incursion into a network, a DDoS attack, an installation of spyware, malware, and/or a virus, and/or a cyber ransom attempt—e.g., via an installation and/or occurrence of ransomware, any or all with respect to the cyber asset(s). In some embodiments, data descriptive of and/or indicative of the cyber threat may be stored in the blockchain, e.g., by execution of the chain code instructions. A cyber threat block may be generated and recorded, for example, by appending it to the monitoring block in the blockchain data structure. In some embodiments, the monitoring block may be updated to indicate the relationship with the newly-added cyber threat block. In such a manner, for example, the cyber threat may be registered with the blockchain system.

In some embodiments, the method 600 may comprise outputting (e.g., by the processing device, via the electronic communication network, and/or to a remote user device) an alert, at 616. In the case that the cyber threat is detected and/or identified, for example, data descriptive of the cyber threat may be shared amongst peer and/or node devices and/or transmitted to one or more other devices (e.g., an IT service provider device), e.g., to one or more addresses stored with respect to the policy/product. In some embodiments, data descriptive of and/or indicative of the alert may be stored in the blockchain, e.g., by execution of the chain code instructions. An alert block may be generated and recorded, for example, by appending it to the cyber threat block in the blockchain data structure. In some embodiments, the cyber threat block may be updated to indicate the relationship with the newly-added alert block.

According to some embodiments, the method 600 may comprise determining (e.g., by the processing device) whether the cyber threat meets a condition, at 618. In the case that the cyber threat is detected and/or identified, for example, data descriptive of the cyber threat may be compared to stored thresholds and/or evaluated utilizing stored rules to determine whether the detected cyber event meets policy criteria (e.g., for automatic claim payment). Various data parameters of the cyber threat event, such as a time/date of the cyber threat event, a type of event, an extent of incursion, estimated damage to the cyber asset(s), etc., may be utilized, for example, to identify matches with one or more condition statuses, desired actions/responses, notification requirements, etc. In some embodiments, data descriptive of and/or indicative of the condition status may be stored in the blockchain, e.g., by execution of the chain code instructions. A condition status block may be generated and recorded, for example, by appending it to the alert block in the blockchain data structure. In some embodiments, the alert block may be updated to indicate the relationship with the newly-added condition status block.

In some embodiments, the method 600 may comprise disabling (e.g., by the processing device) the cyber asset, at 620. In the case that the cyber threat event is determined to satisfy and/or meet the condition and/or criteria, for example, action may be automatically taken to minimize the incursion and/or damage, and/or to prevent additional events. In some embodiments, the cyber asset may be disabled by blocking access thereto, shutting off power to a network device (e.g., the cyber asset itself), and/or changing network and/or cyber asset settings. In some embodiments, the disabling/mitigation/remediation may comprise one or more of: (i) encrypting a file, (ii) encrypting a server, (iii) encrypting a database, (iv) encrypting a website, (v) blocking access to an IP address, (vi) changing a DNS setting, (vii) changing a port setting, and (viii) powering-down a network device. In the case that the cyber threat event is believed to have originated in a particular country, for example, a domain and/or network-type cyber asset may be modified by instituting geo-blocking that specifically excludes network traffic from the identified country. In the case that the cyber asset comprises a network device, such as a server, laptop, smart phone, switch, router, and/or firewall, power to the cyber asset may be automatically disrupted and/or terminated, e.g., to stop and/or prevent additional damage. In some embodiments, data descriptive of and/or indicative of the disabling (and/or other remedial action) may be stored in the blockchain, e.g., by execution of the chain code instructions. A remedial action block may be generated and recorded, for example, by appending it to the condition status block in the blockchain data structure. In some embodiments, the condition status block may be updated to indicate the relationship with the newly-added remedial action block.

According to some embodiments, the method 600 may comprise authorizing (e.g., by the processing device) payment of a cyber insurance claim, at 622. In the case that the condition/criteria comprises a rule defining when claim payment pursuant to the cyber risk insurance policy is permitted, for example, and the condition/criteria is determined to have been met by the detected cyber threat event, the insurance device may trigger and/or authorize payment for the cyber threat event occurrence. In some embodiments, the insurance device may transmit payment authorization to a financial services device to effectuate payment to the user (and/or the user's designee; e.g., the user's IT vendor). According to some embodiments, an amount of damage caused by the cyber threat event may be estimated and the authorized payment amount may be established as a percentage thereof (and/or a portion thereof, e.g., the total damage amount minus any deductible amount). In some embodiments, the remedial action must be taken (automatically and/or as authorized and/or triggered by the user) for the payment to be effectuated. In some embodiments, data descriptive of and/or indicative of the payment may be stored in the blockchain, e.g., by execution of the chain code instructions. A payment block may be generated and recorded, for example, by appending it to the remedial action block in the blockchain data structure. In some embodiments, the remedial action block may be updated to indicate the relationship with the newly-added payment block.

In some embodiments, any transmissions that are sent and/or received between the various devices that may be utilized by the parties to the cyber risk underwriting product/policy contract (and/or a blockchain management device or service) may be secured via any compression and/or encryption protocols that are or become known or practicable. According to some embodiments, fewer or more devices, data storage structures, chain code instances, and/or cyber risk underwriting product/policy ledger recordation events may be included in the method 600. In some embodiments, any or all blockchain recordation events may be propagated or mirrored across devices and/or cyber risk underwriting product/policy ledger instances, e.g., in accordance with chain code instructions and/or protocols.

V. Blockchain-Based Cyber Threat Management Interfaces

Figure 7A:
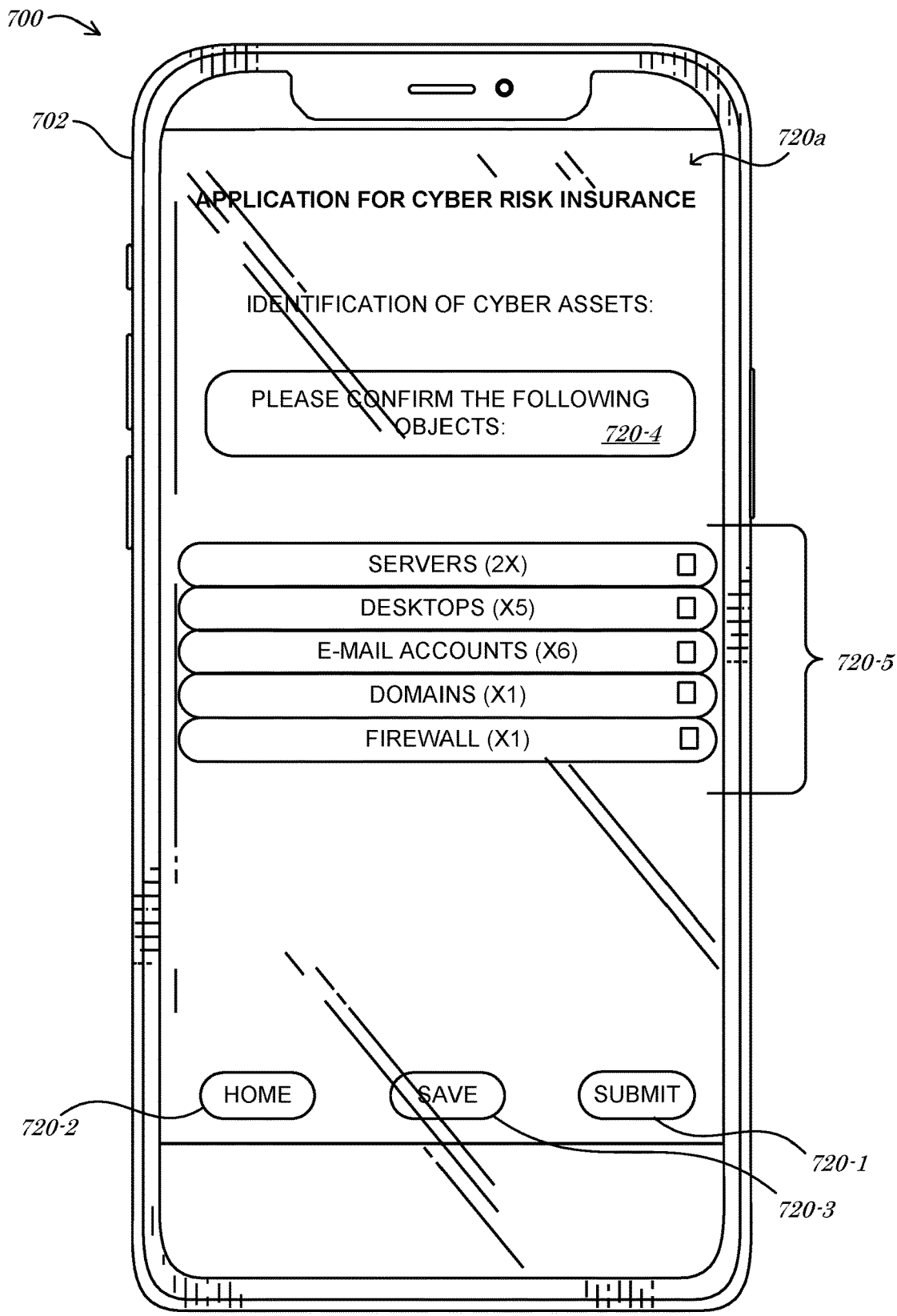
FIG. 7A, FIG. 7B, and FIG. 7C are diagrams of an example interface system according to some embodiments.
Figure 7B:
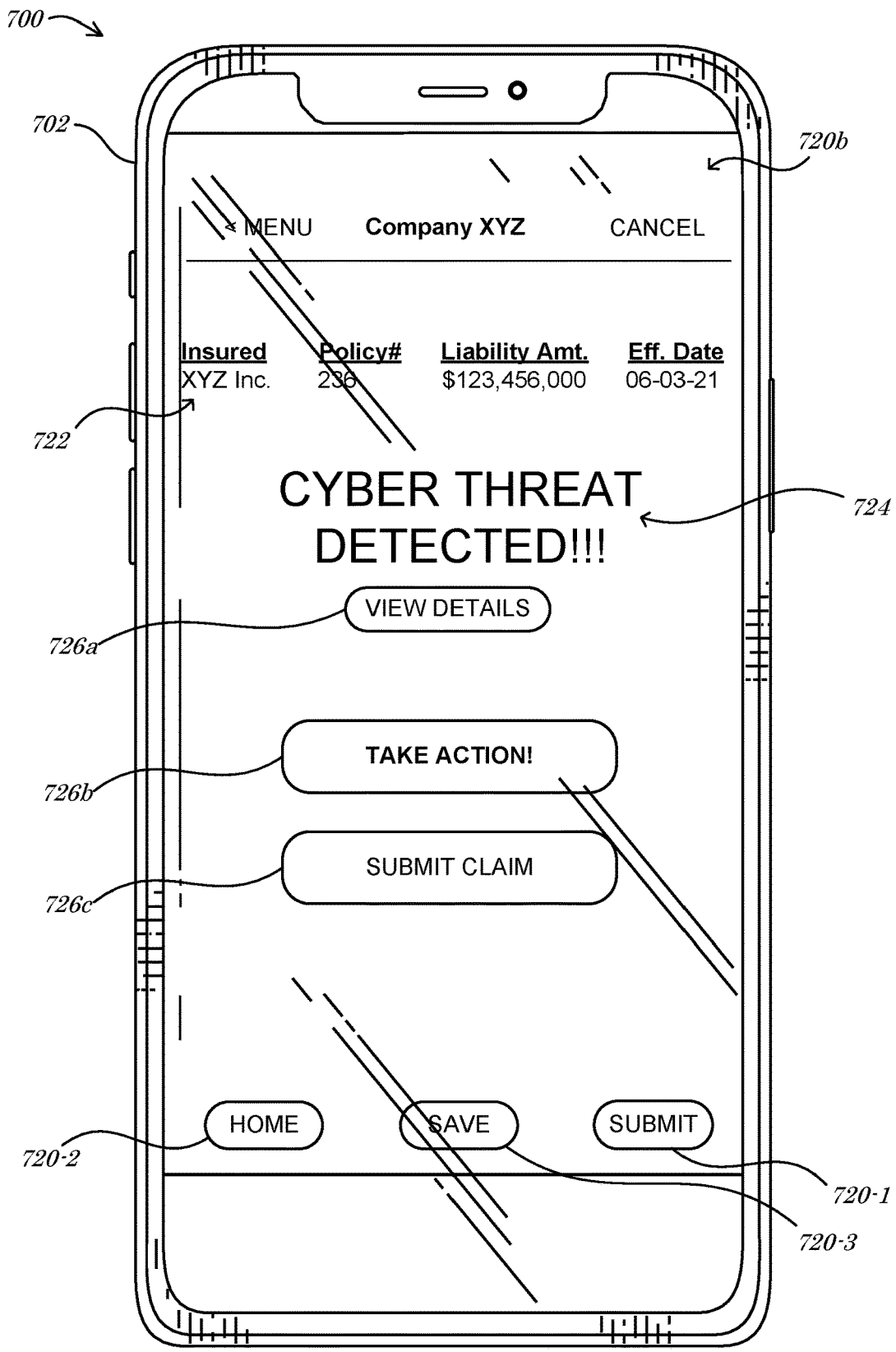
Figure 7C:
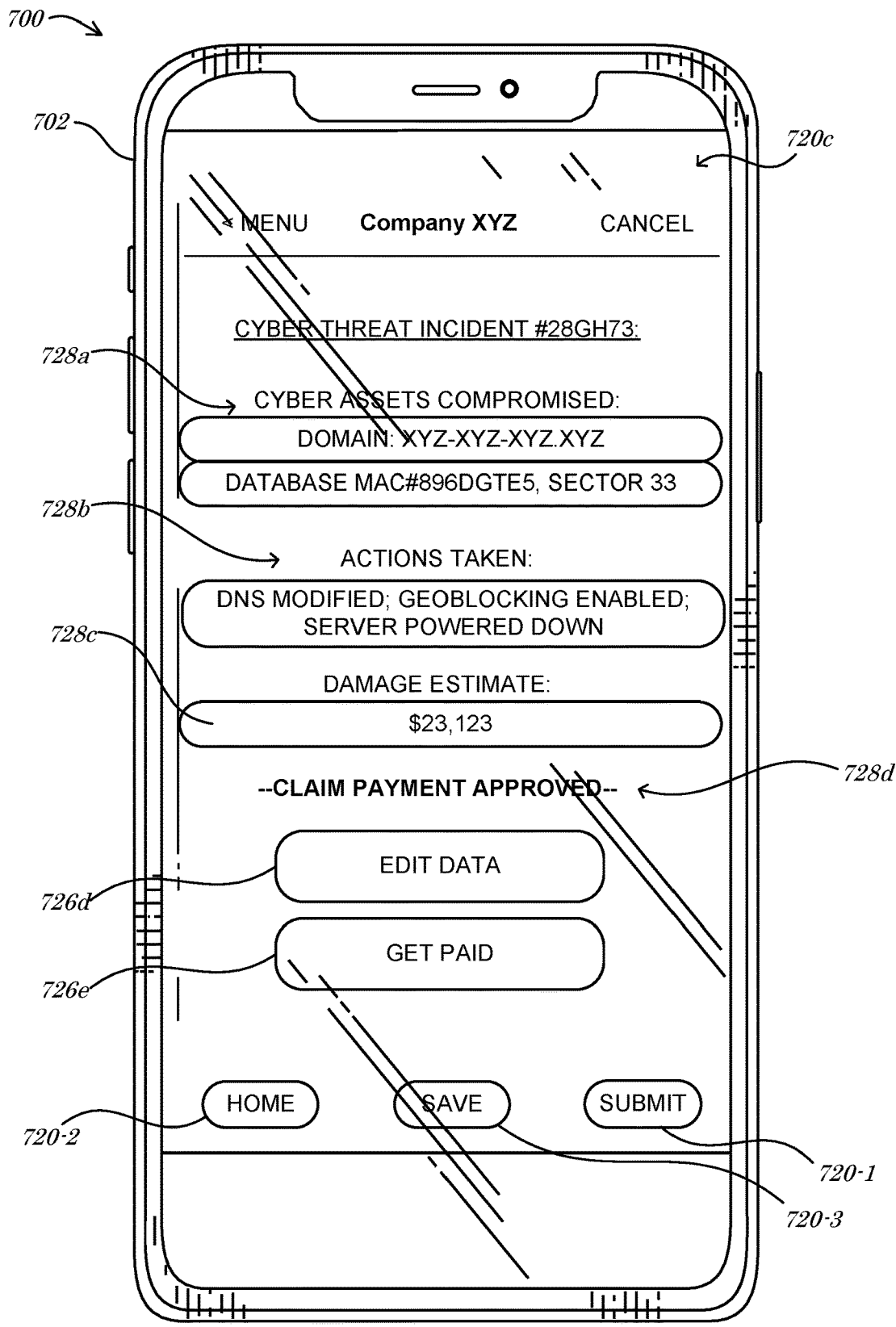

Turning now to FIG. 7A, FIG. 7B, and FIG. 7C, diagrams of an example interface system 700 according to some embodiments are shown. In some embodiments, the interface system 700 may comprise a mobile electronic user device 702 that outputs one or more interfaces 720a-c. According to some embodiments, the interfaces 720a-c may comprise one or more of a web page, web form, database entry form, API, spreadsheet, table, and/or application or other GUI via which a user or other entity may enter data (e.g., provide or define input) descriptive of a cyber asset (not separately shown) and receive output descriptive of a cyber risk underwriting product/policy and one or more cyber threats thereof, as described herein. The interfaces 720a-c may, for example, comprise a front-end of a blockchain-based cyber threat management program and/or platform programmed and/or otherwise configured to execute, conduct, and/or facilitate the methods 500, 600 of FIG. 5 and/or FIG. 6 herein, and/or portions or combinations thereof. In some embodiments, the interfaces 720a-e may be output via a computerized and/or specially-programmed device, such as the node devices 102a-n, 202a-c, 302a-d, 502a-d, the third-party, blockchain services, and/or orderer devices 106, 206, 306, 506 and/or the server, cyber risk management, private blockchain fabric devices, and/or apparatus 110, 210, 310, 810, all of FIG. 1, FIG. 2, FIG. 3, FIG. 5, and/or FIG. 8 herein.

According to some embodiments, the interfaces 720a-c may comprise one or more tabs and/or other segmented and/or logically-presented data forms and/or fields. In some embodiments, the interfaces 720a-c may be configured and/or organized to allow and/or facilitate identification, selection, and/or entry of information descriptive of one or more cyber assets, such as websites, domains, URL addresses, computer hardware and/or network components and/or devices, data elements, data storage devices, etc. According to some embodiments, the interfaces 720a-c may comprise a menu and/or data entry page from which a user may select one or more options that initiate specific functionality of a mobile device application. As depicted in FIG. 7A, for example, a first version (or page or instance) of the interface 720a may comprise a data acquisition and/or entry interface that provides one or more data input and/or output mechanisms, tools, objects, and/or features, such as a submit button 720-1, a home button 720-2, a save button 720-3, an instruction window 720-4, and/or a listing 720-5 of one or more cyber assets. In some embodiments, the first version of the interface 720a may be generated in response to an initiation of a request/application for a cyber risk underwriting product/policy. In some embodiments, various cyber assets may be automatically identified and/or classified (or may be entered and/or defined by a user) and may be presented to the user via the listing 720-5. According to some embodiments, the user may be prompted to enter and/or confirm information descriptive of the cyber assets (e.g., the listing 720-5). An automatic scan and/or analysis of one or more computer network devices associated with the user (such as the mobile electronic user device 702) may be conducted to identify and/or classify one or more of the listed cyber assets (and/or details thereof), for example, and the user may confirm, delete, and/or edit the auto-generated (and/or user-defined) listing 720-5. In some embodiments, activation of the home button 720-2 may cause a GUI navigation to a "home screen" or page (e.g., the first interface 720a) and/or the save button 720-3 may, upon activation, cause the entered, generated, and/or selected data (e.g., the data in the listing 720-5) to be stored (e.g., for future reference and/or use). According to some embodiments, the user may activate the submit button 720-1 to submit the request/application and/or to generate and/or access an active account/policy screen, such as may be provided by a second version (or page or instance) of the interface 720b (e.g., defining a second input and/or output mechanism) as depicted in FIG. 7B.

According to some embodiments, the second version of the interface 720b may provide an active cyber risk policy/product information screen. As depicted in FIG. 7B, for example, the second version of the interface 720b may comprise the universal GUI submit button 720-1, home button 720-2, and save button 720-3, may output policy details 722, may output a cyber threat alert 724, and/or may provide various actuatable buttons 726a-c, such as a view details button 726a, a take action button 726b, and/or a submit claim button 726c. In some embodiments, the cyber threat alert 724 may be output in response to an automatic detection of a cyber threat event due to ongoing monitoring of one or more cyber assets from the policy (e.g., the policy for which details are provided via the policy details 722). According to some embodiments, the view details button 726a may be actuated to navigate to a screen (not shown) that provides details of the cyber threat event, such as, but not limited to, a time, date, duration, geolocation, network location, type, audit trail (e.g., accessed applications and/or data), estimated damage, etc., of the cyber threat event. In some embodiments, the take action button 726b may be actuated to enable user-defined cyber threat event response. According to some embodiments, the submit claim button 726c may be actuated to trigger a transmission of data and/or evaluation of the cyber threat event data with respect to (and/or defining) a claim on the policy. Either of the response and/or the claim actions may be conducted automatically (e.g., without user input and/or intervention), e.g., in response to a detection of the cyber threat event and/or in response to the alert 724. According to some embodiments, the user may activate the take action button 726b and/or the submit claim button 726c to generate and/or access a cyber threat event response screen, such as may be provided by a third version (or page or instance) of the interface 720c (e.g., defining a third input and/or output mechanism) as depicted in FIG. 7C.

In some embodiments, the third version of the interface 720c may provide a cyber threat response information screen. As depicted in FIG. 7C, for example, the third version of the interface 720c may comprise the universal GUI submit button 720-1, home button 720-2, and save button 720-3, may output cyber target details 728a, may output response action details 728b, may output estimated damage 728c, may output a claim decision 728d, and/or may provide various actuatable buttons 726d-e, such as an edit data button 726d and/or a get paid button 726e. According to some embodiments, the cyber target details 728a may provide data descriptive of any cyber assets that have been affected by the cyber threat event, the response action details 728b may provide data descriptive of any remedial, corrective, and/or mitigating actions taken (automatically and/or as defined/triggered by a user), and/or the estimated damage 728c may comprise a damage estimate due to, e.g., damaged hardware, corrupted software, corrupted, locked, and/or lost data, estimated labor to rebuild virtual server, client, and/or database instances and/or reinstall software, etc. In some embodiments, the claim decision 728d may comprise an automatically-generated determination regarding whether the cyber threat event and/or any specific damage thereof is covered by the cyber risk policy.

According to some embodiments, the edit data button 726d may be actuated to permit a user to add and/or change data of the cyber target details 728a, the response action details 728b, and/or the estimated damage 728c. While certain aspects of the cyber threat event may have been automatically (and quickly) determined and/or identified, for example, some details may require forensic analysis to uncover and/or may take time to formulate. In such cases, the user (and/or their IT personnel) may edit the data to reflect any necessary changes, additions, or deletions (which may, e.g., change the estimated damage 728c and/or the claim decision 728d). In some embodiments, the get paid button 726e may be actuated to effectuate a monetary transaction that, e.g., pays the user the estimated damage 728c (or a different claim amount).

Fewer or more components 702, 720a-c, 720-1, 720-2, 720-3, 720-4, 720-5, 722, 72, 726a-e, 728a-d and/or various configurations of the depicted components 702, 720a-c, 720-1, 720-2, 720-3, 720-4, 720-5, 722, 72, 726a-e, 728a-d may be included in the system 700 without deviating from the scope of embodiments described herein. In some embodiments, the components 702, 720a-c, 720-1, 720-2, 720-3, 720-4, 720-5, 722, 72, 726a-e, 728a-d may be similar in configuration and/or functionality to similarly named and/or numbered components as described herein. In some embodiments, the system 700 (and/or portions thereof) may comprise a blockchain-based cyber threat management program, system, and/or platform programmed and/or otherwise configured to execute, conduct, and/or facilitate the methods 500, 600 of FIG. 5 and/or FIG. 6 herein, and/or portions or combinations thereof.

While various components of the interfaces 720a-c have been depicted with respect to certain labels, layouts, headings, titles, and/or configurations, these features have been presented for reference and example only. Other labels, layouts, headings, titles, and/or configurations may be implemented without deviating from the scope of embodiments herein. Similarly, while a certain number of tabs, information screens, form fields, and/or data entry options have been presented, variations thereof may be practiced in accordance with some embodiments.

VI. Blockchain-Based Cyber Threat Management Apparatus and Articles of Manufacture Turning to FIG. 8, a block diagram of an apparatus 810 according to some embodiments is shown. In some embodiments, the apparatus 810 may be similar in configuration and/or functionality to any of the node devices 102a-n, 202a-c, 302a-d, 502a-d, 702, the third-party, blockchain services, and/or orderer devices 106, 206, 306, 506 and/or the server, cyber risk management, and/or private blockchain fabric devices 110, 210, 310, all of FIG. 1, FIG. 2, FIG. 3, FIG. 5, FIG. 7A, FIG. 7B, and/or FIG. 7C herein. The apparatus 810 may, for example, execute, process, facilitate, and/or otherwise be associated with the methods 500, 600 of FIG. 5 and/or FIG. 6 herein, and/or portions or combinations thereof. In some embodiments, the apparatus 810 may comprise a processing device 812, a transceiver device 814, an input device 816, an output device 818, an interface 820, a memory device 840 (storing various programs and/or instructions 842 and data 844), and/or a cooling device 850. According to some embodiments, any or all of the components 812, 814, 816, 818, 820, 840, 842, 844, 850 of the apparatus 810 may be similar in configuration and/or functionality to any similarly named and/or numbered components described herein. Fewer or more components 812, 814, 816, 818, 820, 840, 842, 844, 850 and/or various configurations of the components 812, 814, 816, 818, 820, 840, 842, 844, 850 be included in the apparatus 810 without deviating from the scope of embodiments described herein.

According to some embodiments, the processor 812 may be or include any type, quantity, and/or configuration of processor that is or becomes known. The processor 812 may comprise, for example, an Intel® IXP 2800 network processor or an Intel® XEON™ Processor coupled with an Intel® E8501 chipset. In some embodiments, the processor 812 may comprise multiple inter-connected processors, microprocessors, and/or micro-engines. According to some embodiments, the processor 812 (and/or the apparatus 810 and/or other components thereof) may be supplied power via a power supply (not shown), such as a battery, an Alternating Current (AC) source, a Direct Current (DC) source, an AC/DC adapter, solar cells, and/or an inertial generator. In the case that the apparatus 810 comprises a server, such as a blade server, necessary power may be supplied via a standard AC outlet, power strip, surge protector, and/or Uninterruptible Power Supply (UPS) device.

In some embodiments, the transceiver device 814 may comprise any type or configuration of communication device that is or becomes known or practicable. The transceiver device 814 may, for example, comprise a Network Interface Card (NIC), a telephonic device, a cellular network device, a router, a hub, a modem, and/or a communications port or cable. According to some embodiments, the transceiver device 814 may also or alternatively be coupled to the processor 812. In some embodiments, the transceiver device 814 may comprise an IR, RF, Bluetooth™, Near-Field Communication (NFC), and/or Wi-Fi® network device coupled to facilitate communications between the processor 812 and another device (not shown).

According to some embodiments, the input device 816 and/or the output device 818 are communicatively coupled to the processor 812 (e.g., via wired and/or wireless connections and/or pathways) and they may generally comprise any types or configurations of input and output components and/or devices that are or become known, respectively. The input device 816 may comprise, for example, a keyboard that allows an operator of the apparatus 810 to interface with the apparatus 810 (e.g., by a consumer and/or broker, such as to purchase a cyber risk insurance policy with automatic blockchain-enabled cyber threat management, as described herein). The output device 818 may, according to some embodiments, comprise a display screen and/or other practicable output component and/or device. The output device 818 may, for example, provide an interface (such as the interface 820 and/or the interfaces 720*a-c* of FIG. 7A, FIG. 7B, and/or FIG. 7C herein) via which blockchain-based cyber threat management information is provided to a user (e.g., via a website and/or mobile application). According to some embodiments, the input device 816 and/or the output device 818 may comprise and/or be embodied in a single device, such as a touch-screen monitor.

The memory device 840 may comprise any appropriate information storage device that is or becomes known or available, including, but not limited to, units and/or combinations of magnetic storage devices (e.g., a hard disk drive), optical storage devices, and/or semiconductor memory devices, such as RAM devices, Read Only Memory (ROM) devices, Single Data Rate Random Access Memory (SDR-RAM), Double Data Rate Random Access Memory (DDR-RAM), and/or Programmable Read Only Memory (PROM). The memory device 840 may, according to some embodiments, store one or more of chain code instructions 842-1, cyber threat instructions 842-2, underwriting instructions 842-3, interface instructions 842-4, blockchain data 844-1, cyber asset data 844-2, and/or darkweb data 844-3. In some embodiments, the chain code instructions 842-1, cyber threat instructions 842-2, underwriting instructions 842-3, interface instructions 842-4, blockchain data 844-1, cyber asset data 844-2, and/or darkweb data 844-3 may be utilized by the processor 812 to provide output information via the output device 818 and/or the transceiver device 814.

According to some embodiments, the chain code instructions 842-1 may be operable to cause the processor 812 to process the blockchain data 844-1, cyber asset data 844-2, and/or darkweb data 844-3 in accordance with embodiments as described herein. Blockchain data 844-1, cyber asset data 844-2, and/or darkweb data 844-3 received via the input device 816 and/or the transceiver device 814 may, for example, be analyzed, sorted, filtered, decoded, decompressed, ranked, scored, plotted, and/or otherwise processed by the processor 812 in accordance with the chain code instructions 842-1. In some embodiments, blockchain data 844-1, cyber asset data 844-2, and/or darkweb data 844-3 may be fed by the processor 812 through one or more mathematical and/or statistical formulas and/or models in accordance with the chain code instructions 842-1 to automatically generate, record, update, append, and/or propagate data blocks to implement a blockchain-based cyber threat management system as described herein.

In some embodiments, the cyber threat instructions 842-2 may be operable to cause the processor 812 to process the blockchain data 844-1, cyber asset data 844-2, and/or darkweb data 844-3 in accordance with embodiments as described herein. Blockchain data 844-1, cyber asset data 844-2, and/or darkweb data 844-3 received via the input device 816 and/or the transceiver device 814 may, for example, be analyzed, sorted, filtered, decoded, decompressed, ranked, scored, plotted, and/or otherwise processed by the processor 812 in accordance with the cyber threat instructions 842-2. In some embodiments, blockchain data 844-1, cyber asset data 844-2, and/or darkweb data 844-3 may be fed by the processor 812 through one or more mathematical and/or statistical formulas and/or models in accordance with the cyber threat instructions 842-2 to automatically assess, reassess, identify a cyber threat event for, generate an alert for, and/or automatically disable and/or remediate one or more cyber assets, as described herein.

According to some embodiments, the underwriting instructions 842-3 may be operable to cause the processor 812 to process the blockchain data 844-1, cyber asset data 844-2, and/or darkweb data 844-3 in accordance with embodiments as described herein. Blockchain data 844-1, cyber asset data 844-2, and/or darkweb data 844-3 received via the input device 816 and/or the transceiver device 814 may, for example, be analyzed, sorted, filtered, decoded, decompressed, ranked, scored, plotted, and/or otherwise processed by the processor 812 in accordance with the underwriting instructions 842-3. In some embodiments, blockchain data 844-1, cyber asset data 844-2, and/or darkweb data 844-3 may be fed by the processor 812 through one or more mathematical and/or statistical formulas and/or models in accordance with the underwriting instructions 842-3 to calculate, compute, and/or generate or identify one or more underwriting decisions (e.g., rate, quote, approve, deny, modify), as described herein.

In some embodiments, the interface instructions 842-4 may be operable to cause the processor 812 to process the blockchain data 844-1, cyber asset data 844-2, and/or darkweb data 844-3 in accordance with embodiments as described herein. Blockchain data 844-1, cyber asset data 844-2, and/or darkweb data 844-3 received via the input device 816 and/or the transceiver device 814 may, for example, be analyzed, sorted, filtered, decoded, decompressed, ranked, scored, plotted, and/or otherwise processed by the processor 812 in accordance with the interface instructions 842-4. In some embodiments, blockchain data 844-1, cyber asset data 844-2, and/or darkweb data 844-3 may be fed by the processor 812 through one or more mathematical and/or statistical formulas and/or models in accordance with the interface instructions 842-4 to provide an interface (such as the interfaces 720*a-c* of FIG. 7A, FIG. 7B, and/or FIG. 7C herein) via which input and/or output descriptive of cyber assets, cyber risk underwriting policies and/or products, and/or cyber threat events (and/or remediation actions in response thereto) is provided, as described herein.

According to some embodiments, the apparatus 810 may comprise the cooling device 850. According to some embodiments, the cooling device 850 may be coupled (physically, thermally, and/or electrically) to the processor 812 and/or to the memory device 840. The cooling device 850 may, for example, comprise a fan, heat sink, heat pipe, radiator, cold plate, and/or other cooling component or device or combinations thereof, configured to remove heat from portions or components of the apparatus 810.

Any or all of the exemplary instructions and data types described herein and other practicable types of data may be stored in any number, type, and/or configuration of memory devices that is or becomes known. The memory device 840 may, for example, comprise one or more data tables or files, databases, table spaces, registers, and/or other storage structures. In some embodiments, multiple databases and/or storage structures (and/or multiple memory devices 840) may be utilized to store information associated with the apparatus 810. According to some embodiments, the memory device 840 may be incorporated into and/or otherwise coupled to the apparatus 810 (e.g., as shown) or may simply be accessible to the apparatus 810 (e.g., externally located and/or situated).

Referring to FIG. 9A, FIG. 9B, FIG. 9C, FIG. 9D, and FIG. 9E, perspective diagrams of exemplary data storage devices 940*a-e* according to some embodiments are shown.

Figure 8:
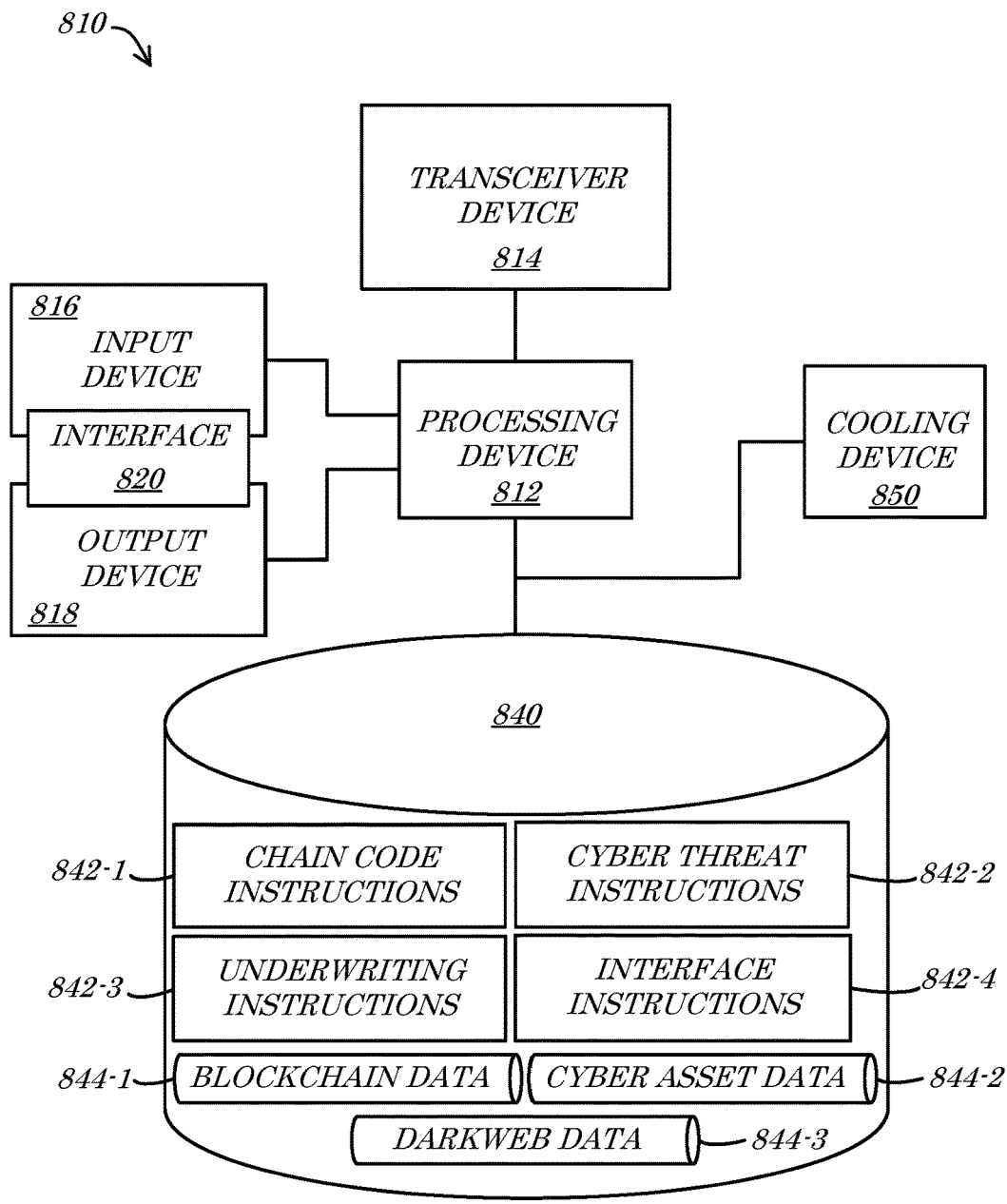
FIG. 8 is a block diagram of an apparatus according to some embodiments.
Figure 9A:
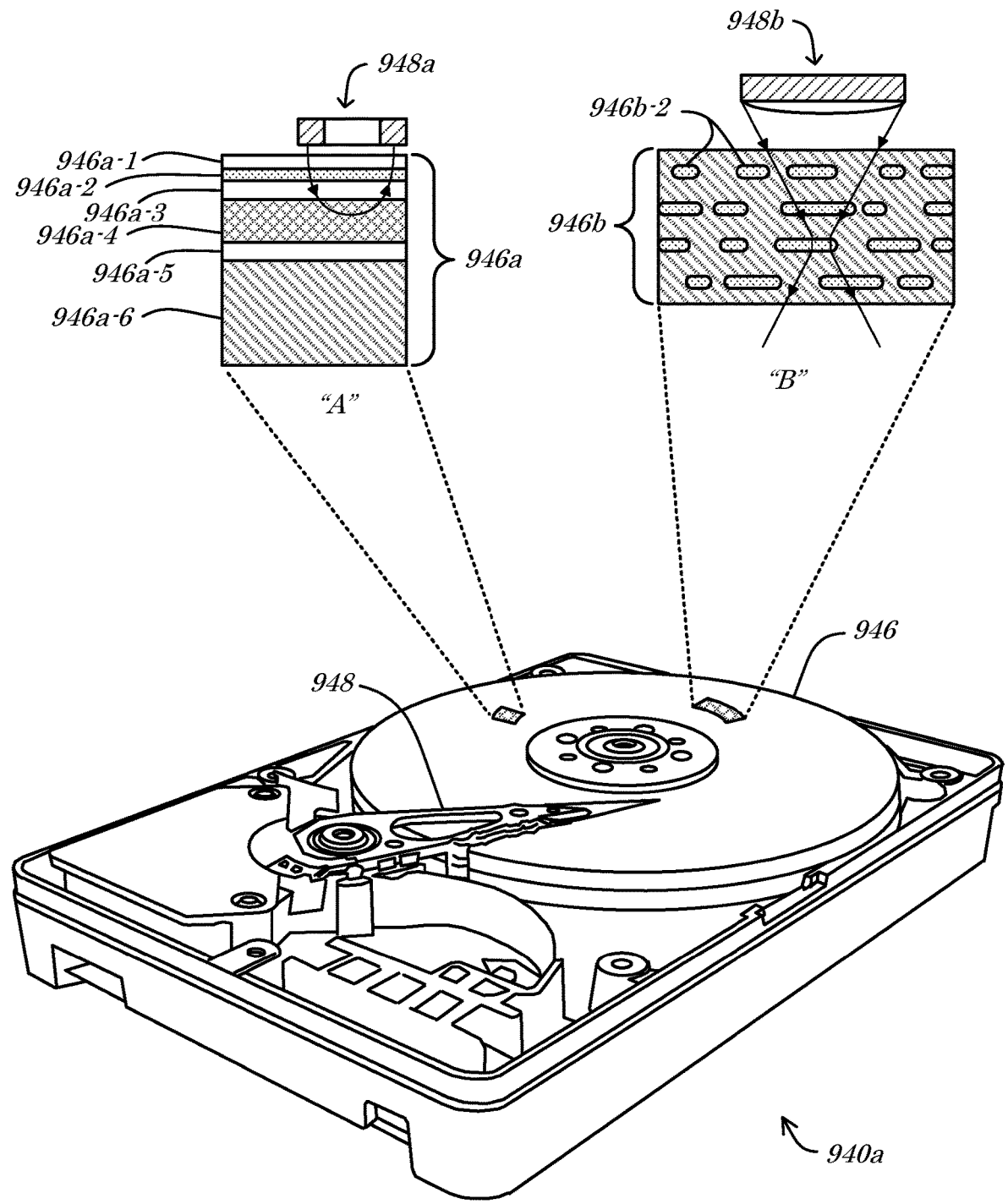
FIG. 9A, FIG. 9B, FIG. 9C, FIG. 9D, and FIG. 9E are perspective diagrams of exemplary data storage devices according to some embodiments.
Figure 9B:
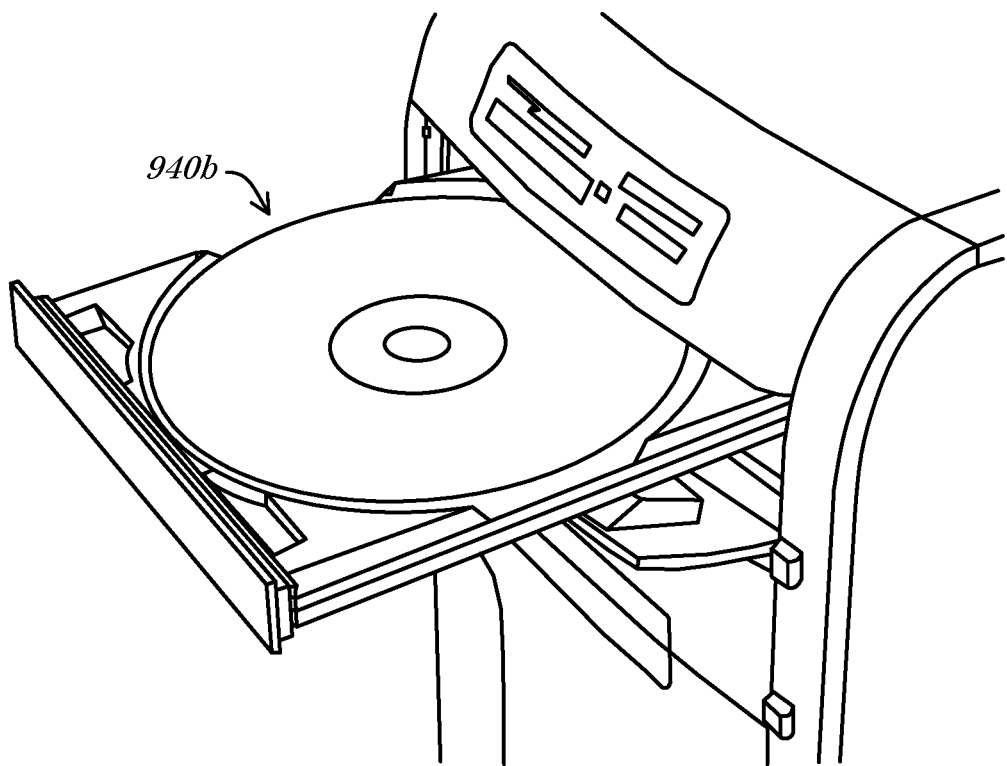
Figure 9C:
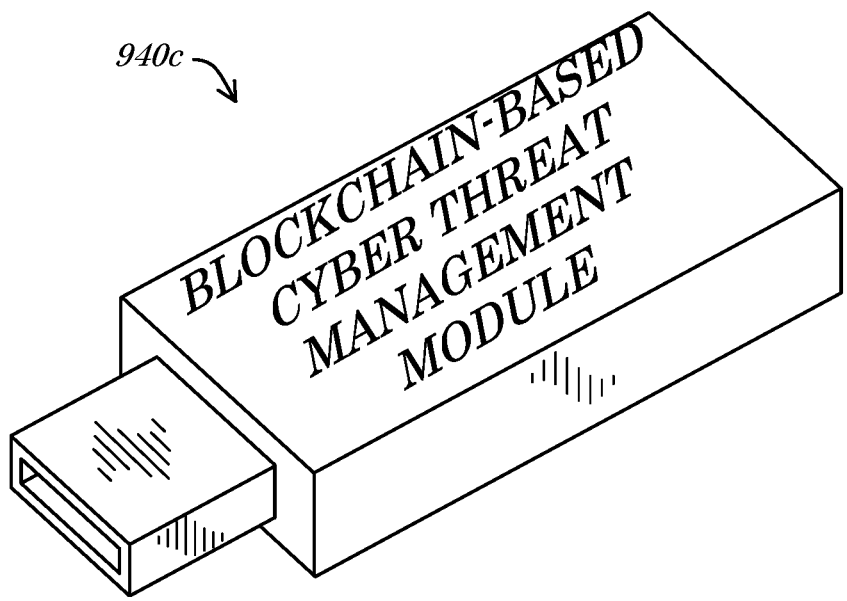
Figure 9D:
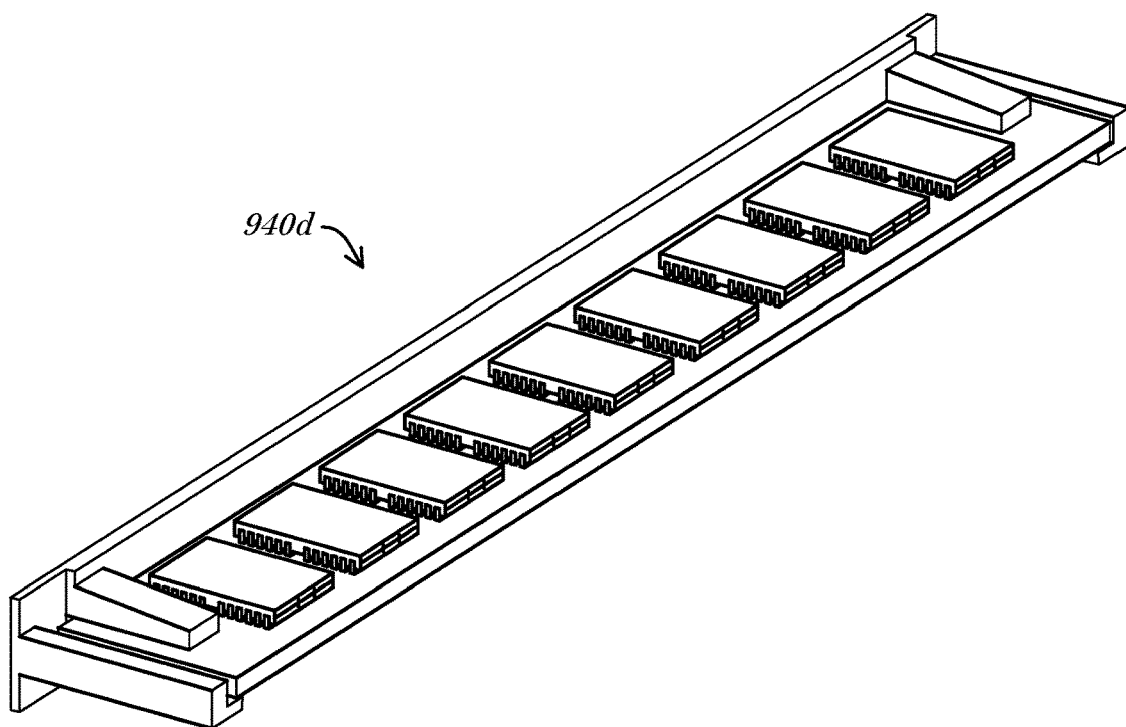
Figure 9E:
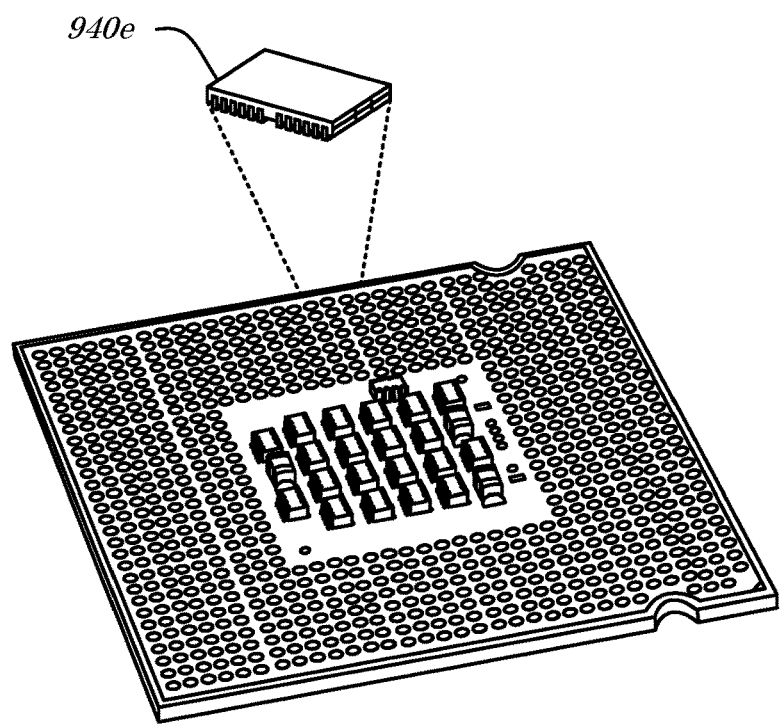

The data storage devices 940*a-e* may, for example, be utilized to store instructions and/or data, such as the chain code instructions 842-1, cyber threat instructions 842-2, underwriting instructions 842-3, interface instructions 842-4, blockchain data 844-1, cyber asset data 844-2, and/or darkweb data 844-3, each of which is presented in reference to FIG. 8 herein. In some embodiments, instructions stored on the data storage devices 940*a-e* may, when executed by a processor, cause the implementation of and/or facilitate the methods 500, 600 of FIG. 5 and/or FIG. 6 herein, and/or portions or combinations thereof.

According to some embodiments, the first data storage device 940*a* may comprise one or more various types of internal and/or external hard drives. The first data storage device 940*a* may, for example, comprise a data storage medium 946 that is read, interrogated, and/or otherwise communicatively coupled to and/or via a disk reading device 948. In some embodiments, the first data storage device 940*a* and/or the data storage medium 946 may be configured to store information utilizing one or more magnetic, inductive, and/or optical means (e.g., magnetic, inductive, and/or optical-encoding). The data storage medium 946, depicted as a first data storage medium 946*a* for example (e.g., breakout cross-section "A"), may comprise one or more of a polymer layer 946*a*-1, a magnetic data storage layer 946*a*-2, a non-magnetic layer 946*a*-3, a magnetic base layer 946*a*-4, a contact layer 946*a*-5, and/or a substrate layer 946*a*-6. According to some embodiments, a magnetic read head 948*a* may be coupled and/or disposed to read data from the magnetic data storage layer 946*a*-2.

In some embodiments, the data storage medium 946, depicted as a second data storage medium 946*b* for example (e.g., breakout cross-section "B"), may comprise a plurality of data points 946*b*-2 disposed with the second data storage medium 946*b*. The data points 946*b*-2 may, in some embodiments, be read and/or otherwise interfaced with via a laser-enabled read head 948*b* disposed and/or coupled to direct a laser beam through the second data storage medium 946*b*.

In some embodiments, the second data storage device 940*b* may comprise a CD, CD-ROM, DVD, Blu-Ray™ Disc, and/or other type of optically-encoded disk and/or other storage medium that is or becomes know or practicable. In some embodiments, the third data storage device 940*c* may comprise a USB keyfob, dongle, and/or other type of flash memory data storage device that is or becomes know or practicable. In some embodiments, the fourth data storage device 940*d* may comprise RAM of any type, quantity, and/or configuration that is or becomes practicable and/or desirable. In some embodiments, the fourth data storage device 940*d* may comprise an off-chip cache, such as a Level 2 (L2) cache memory device. According to some embodiments, the fifth data storage device 940*e* may comprise an on-chip memory device, such as a Level 1 (L1) cache memory device.

The data storage devices 940*a-e* may generally store program instructions, code, and/or modules that, when executed by a processing device cause a particular machine to function in accordance with one or more embodiments described herein. The data storage devices 940*a-e* depicted in FIG. 9A, FIG. 9B, FIG. 9C, FIG. 9D, and FIG. 9E are representative of a class and/or subset of computer-readable media that are defined herein as "computer-readable memory" (e.g., non-transitory memory devices as opposed to transmission devices or media).

VII. Rules of Interpretation

Throughout the description herein and unless otherwise specified, the following terms may include and/or encompass the example meanings provided. These terms and illustrative example meanings are provided to clarify the language selected to describe embodiments both in the specification and in the appended claims, and accordingly, are not intended to be generally limiting. While not generally limiting and while not limiting for all described embodiments, in some embodiments, the terms are specifically limited to the example definitions and/or examples provided. Other terms are defined throughout the present description.

Some embodiments described herein are associated with a "user device" or a "network device". As used herein, the terms "user device" and "network device" may be used interchangeably and may generally refer to any device that can communicate via a network. Examples of user or network devices include a PC, a workstation, a server, a printer, a scanner, a facsimile machine, a copier, a Personal Digital Assistant (PDA), a storage device (e.g., a disk drive), a hub, a router, a switch, and a modem, a video game console, or a wireless phone. User and network devices may comprise one or more communication or network components. As used herein, a "user" may generally refer to any individual and/or entity that operates a user device. Users may comprise, for example, customers, consumers, product underwriters, product distributors, customer service representatives, agents, brokers, etc.

As used herein, the term "network component" may refer to a user or network device, or a component, piece, portion, or combination of user or network devices. Examples of network components may include a Static Random Access Memory (SRAM) device or module, a network processor, and a network communication path, connection, port, or cable.

In addition, some embodiments are associated with a "network" or a "communication network". As used herein, the terms "network" and "communication network" may be used interchangeably and may refer to any object, entity, component, device, and/or any combination thereof that permits, facilitates, and/or otherwise contributes to or is associated with the transmission of messages, packets, signals, and/or other forms of information between and/or within one or more network devices. Networks may be or include a plurality of interconnected network devices. In some embodiments, networks may be hard-wired, wireless, virtual, neural, and/or any other configuration of type that is or becomes known. Communication networks may include, for example, one or more networks configured to operate in accordance with the Fast Ethernet LAN transmission standard 802.3-2002® published by the Institute of Electrical and Electronics Engineers (IEEE). In some embodiments, a network may include one or more wired and/or wireless networks operated in accordance with any communication standard or protocol that is or becomes known or practicable.

As used herein, the terms "information" and "data" may be used interchangeably and may refer to any data, text, voice, video, image, message, bit, packet, pulse, tone, waveform, and/or other type or configuration of signal and/or information. Information may comprise information packets transmitted, for example, in accordance with the Internet Protocol Version 6 (IPv6) standard as defined by "Internet Protocol Version 6 (IPv6) Specification" RFC 1883, published by the Internet Engineering Task Force (IETF), Network Working Group, S. Deering et al. (December 1995). Information may, according to some embodiments, be compressed, encoded, encrypted, and/or otherwise packaged or manipulated in accordance with any method that is or becomes known or practicable.

In addition, some embodiments described herein are associated with an "indication". As used herein, the term "indication" may be used to refer to any indicia and/or other information indicative of or associated with a subject, item, entity, and/or other object and/or idea. As used herein, the phrases "information indicative of" and "indicia" may be used to refer to any information that represents, describes, and/or is otherwise associated with a related entity, subject, or object. Indicia of information may include, for example, a code, a reference, a link, a signal, an identifier, and/or any combination thereof and/or any other informative representation associated with the information. In some embodiments, indicia of information (or indicative of the information) may be or include the information itself and/or any portion or component of the information. In some embodiments, an indication may include a request, a solicitation, a broadcast, and/or any other form of information gathering and/or dissemination.

Numerous embodiments are described in this patent application, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural, logical, software, and electrical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

Devices that are in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for weeks at a time. In addition, devices that are in communication with each other may communicate directly or indirectly through one or more intermediaries.

A description of an embodiment with several components or features does not imply that all or even any of such components and/or features are required. On the contrary, a variety of optional components are described to illustrate the wide variety of possible embodiments of the present invention(s). Unless otherwise specified explicitly, no component and/or feature is essential or required.

Further, although process steps, algorithms or the like may be described in a sequential order, such processes may be configured to work in different orders. In other words, any sequence or order of steps that may be explicitly described does not necessarily indicate a requirement that the steps be performed in that order. The steps of processes described herein may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention, and does not imply that the illustrated process is preferred.

"Determining" something can be performed in a variety of manners and therefore the term "determining" (and like terms) includes calculating, computing, deriving, looking up (e.g., in a table, database or data structure), ascertaining and the like.

It will be readily apparent that the various methods and algorithms described herein may be implemented by, e.g., appropriately and/or specially-programmed computers and/or computing devices. Typically a processor (e.g., one or more microprocessors) will receive instructions from a memory or like device, and execute those instructions, thereby performing one or more processes defined by those instructions. Further, programs that implement such methods and algorithms may be stored and transmitted using a variety of media (e.g., computer readable media) in a number of manners. In some embodiments, hard-wired circuitry or custom hardware may be used in place of, or in combination with, software instructions for implementation of the processes of various embodiments. Thus, embodiments are not limited to any specific combination of hardware and software.

A "processor" generally means any one or more microprocessors, CPU devices, computing devices, microcontrollers, digital signal processors, or like devices, as further described herein.

The term "computer-readable medium" refers to any medium that participates in providing data (e.g., instructions or other information) that may be read by a computer, a processor or a like device. Such a medium may take many forms, including but not limited to, non-volatile media, volatile media, and transmission media. Non-volatile media include, for example, optical or magnetic disks and other persistent memory. Volatile media include DRAM, which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during RF and IR data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave, or any other medium from which a computer can read.

The term "computer-readable memory" may generally refer to a subset and/or class of computer-readable medium that does not include transmission media, such as waveforms, carrier waves, electromagnetic emissions, etc. Computer-readable memory may typically include physical media upon which data (e.g., instructions or other information) are stored, such as optical or magnetic disks and other persistent memory, DRAM, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, computer hard drives, backup tapes, Universal Serial Bus (USB) memory devices, and the like.

Various forms of computer readable media may be involved in carrying data, including sequences of instructions, to a processor. For example, sequences of instruction (i) may be delivered from RAM to a processor, (ii) may be carried over a wireless transmission medium, and/or (iii)

may be formatted according to numerous formats, standards or protocols, such as Bluetooth™, TDMA, CDMA, 3G.

Where databases are described, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models and/or distributed databases) could be used to store and manipulate the data types described herein. Likewise, object methods or behaviors of a database can be used to implement various processes, such as the described herein. In addition, the databases may, in a known manner, be stored locally or remotely from a device that accesses data in such a database.

The present invention can be configured to work in a network environment including a computer that is in communication, via a communications network, with one or more devices. The computer may communicate with the devices directly or indirectly, via a wired or wireless medium, such as the Internet, LAN, WAN or Ethernet, Token Ring, or via any appropriate communications means or combination of communications means. Each of the devices may comprise computers, such as those based on the Intel® Pentium® or Centrino™ processor, that are adapted to communicate with the computer. Any number and type of machines may be in communication with the computer.

The present disclosure provides, to one of ordinary skill in the art, an enabling description of several embodiments and/or inventions. Some of these embodiments and/or inventions may not be claimed in the present application, but may nevertheless be claimed in one or more continuing applications that claim the benefit of priority of the present application. Applicant intends to file additional applications to pursue patents for subject matter that has been disclosed and enabled but not claimed in the present application.

It will be understood that various modifications can be made to the embodiments of the present disclosure herein without departing from the scope thereof. Therefore, the above description should not be construed as limiting the disclosure, but merely as embodiments thereof. Those skilled in the art will envision other modifications within the scope of the invention as defined by the claims appended hereto.

What is claimed is:

1. A system for blockchain-based cyber threat management, comprising:
    a private blockchain system comprising:
        an orderer device; and
        a plurality of peer devices in communication with the orderer device, each peer device of the plurality of peer devices comprising a distributed memory device storing a copy of a distributed ledger;
    a cyber underwriting API blockchain client device in communication with at least one of the peer devices of the plurality of peer devices;
    a cyber risk API blockchain client device in communication with at least one of the peer devices of the plurality of peer devices; and
    a non-transitory data storage device in communication with at least one of the private blockchain system, the cyber underwriting API blockchain client device, and the cyber risk API blockchain client device, the non-transitory data storage device storing (i) cyber risk underwriting instructions and (ii) processing instructions, that when executed by the at least one of the private blockchain system, the cyber underwriting API blockchain client device, and the cyber risk API blockchain client device, result in:
        receiving, from a user device and by the cyber underwriting API blockchain client device, a request for a quote for a cyber risk underwriting policy, the request for quote defining an identifier of at least one cyber asset to be underwritten;
        querying, utilizing the identifier of the at least one cyber asset and by the cyber underwriting API blockchain client device, a cyber risk assessment service device for a cyber risk rating;
        generating, by an execution of the cyber risk underwriting instructions and based on the cyber risk rating, a quotation for the cyber risk underwriting policy;
        transmitting, to the user device and by the cyber underwriting API blockchain client device, an indication of the quotation for the cyber risk underwriting policy;
        receiving, from the user device and by the cyber underwriting API blockchain client device, an indication of an acceptance of the quotation for the cyber risk underwriting policy;
        generating, by an execution of the cyber risk underwriting instructions and based on the quotation for the cyber risk underwriting policy and in response to the receiving of the indication of the acceptance of the quotation for the cyber risk underwriting policy, a cyber risk underwriting policy;
        registering, by a communication between the cyber underwriting API blockchain client device and a first peer device of the plurality of peer devices of the private blockchain system, the cyber risk underwriting policy with the private blockchain system;
        monitoring, by the cyber risk API blockchain client device, the at least one cyber asset;
        identifying, by the cyber risk API blockchain client device and based on the monitoring, a cyber threat event associated with the at least one cyber asset;
        registering, by a communication between the cyber risk API blockchain client device and a second peer device of the plurality of peer devices of the private blockchain system, the identified cyber threat event; and
        outputting, in response to the identifying of the cyber threat event, an alert descriptive of the cyber threat event.

2. The system of claim 1, wherein the identifier of the at least one cyber asset comprises one or more of (i) a domain name, (ii) a URL, and (iii) an IP address.

3. The system of claim 1, wherein the identifier of the at least one cyber asset comprises one or more of (i) a vulnerability description, (ii) an infection description, (iii) a first seen date, (iv) a last seen date, and (v) an affected network port number.

4. The system of claim 1, wherein the querying of the cyber risk assessment service device for the cyber risk rating, comprises:
    transmitting, by the cyber underwriting API blockchain client device and to the cyber risk assessment service device, the identifier of the at least one cyber asset; and
    receiving, in response to the transmitting of the identifier of the at least one cyber asset, by the cyber underwriting API blockchain client device and from the cyber risk assessment service device, an indication of at least one red flag indicator for the at least one cyber asset.

5. The system of claim 4, wherein the at least one red flag indicator for the at least one cyber asset comprises one or more of: (i) an open port, (ii) a software vulnerability, (iii) an outdated update sequence, and (iv) an existing infection.

6. The system of claim 1, wherein the receiving of the indication of the acceptance of the quotation for the cyber risk underwriting policy comprises a receiving of an indication of a premium payment authorization.

7. The system of claim 6, wherein at least one of the cyber risk underwriting instructions and the processing instructions, when executed by the at least one of the private blockchain system, the cyber underwriting API blockchain client device, and the cyber risk API blockchain client device, further result in:
    selling the cyber risk underwriting policy to a user associated with the user device.

8. The system of claim 1, wherein the generating of the cyber risk underwriting policy, comprises:
    identifying at least one cyber risk condition for the cyber risk underwriting policy; and
    verifying, by transmission of an inquiry to the cyber risk assessment service device, that the at least one cyber asset complies with the at least one cyber risk condition for the cyber risk underwriting policy.

9. The system of claim 8, wherein the at least one cyber risk condition comprises a rule requiring the at least one cyber asset to be free from any red flag indicators during a particular time period.

10. The system of claim 1, wherein the generating of the cyber risk underwriting policy, comprises:
    requesting, by transmission of an inquiry to the cyber risk assessment service device and utilizing the identifier of the at least one cyber asset, a cyber risk assessment of the at least one cyber asset;
    receiving, from the cyber risk assessment service device and in response to the requesting, the cyber risk assessment of the at least one cyber asset; and
    establishing, based on the cyber risk assessment of the at least one cyber asset, at least one cyber risk condition for the cyber risk underwriting policy.

11. The system of claim 10, wherein the cyber risk assessment of the at least one cyber asset comprises a search of the darkweb utilizing information descriptive of the at least one cyber asset.

12. The system of claim 1, wherein the generating of the cyber risk underwriting policy, comprises:
    identifying contact information for one or more parties to be alerted in the case of a cyber threat event detection.

13. The system of claim 12, wherein the outputting of the alert descriptive of the cyber threat event comprises a transmission of the alert utilizing the contact information for the one or more parties to be alerted in the case of the cyber threat event detection.

14. The system of claim 1, wherein the identifying of the cyber threat event associated with the at least one cyber asset, comprises:
    accessing, by the cyber risk API blockchain client device, the private blockchain system, and comparing the cyber threat event to at least one condition of the cyber risk underwriting policy stored in the distributed ledger; and
    determining that the at least one condition is violated by the identified cyber threat event.

15. The system of claim 1, wherein at least one of the cyber risk underwriting instructions and the processing instructions, when executed by the at least one of the private blockchain system, the cyber underwriting API blockchain client device, and the cyber risk API blockchain client device, further result in:
    accessing, by the cyber risk API blockchain client device, the private blockchain system, and comparing the cyber threat event to at least one condition of the cyber risk underwriting policy stored in the distributed ledger;
    determining that the at least one condition is satisfied by the identified cyber threat event; and
    authorizing, by a third peer of the plurality of peer devices of the private blockchain system, a payment of a claim for the identified cyber threat event.

16. The system of claim 1, wherein at least one of the cyber risk underwriting instructions and the processing instructions, when executed by the at least one of the private blockchain system, the cyber underwriting API blockchain client device, and the cyber risk API blockchain client device, further result in:
    disabling, automatically and in response to the alert descriptive of the cyber threat event, the at least one cyber asset.

17. The system of claim 16, wherein the disabling of the at least one cyber asset comprises one or more of: (i) encrypting a file, (ii) encrypting a server, (iii) encrypting a database, and (iv) encrypting a website.

18. The system of claim 16, wherein the disabling of the at least one cyber asset comprises one or more of: (i) blocking access to an IP address, (ii) changing a DNS setting, (iii) changing a port setting, and (iv) powering-down a network device.

* * * * *